(12) United States Patent
Kuoch et al.

(10) Patent No.: US 8,379,928 B2
(45) Date of Patent: *Feb. 19, 2013

(54) OBSTACLE DETECTION PROCEDURE FOR MOTOR VEHICLE

(75) Inventors: Siav Kuong Kuoch, Vincennes (FR); Lowik Chanussot, Paris (FR); Julien Rebut, Paris (FR); Adrien Charpentier, Stuttgart (DE); Eric Dubois, Rosny Sous Bois (FR); Benoist Fleury, Vincennes (FR); Patrice Reilhac, Esslingen (DE)

(73) Assignee: Valeo Vision, Bobigny (FR)

( * ) Notice: Subject to any disclaimer, the term of this patent is extended or adjusted under 35 U.S.C. 154(b) by 406 days.

This patent is subject to a terminal disclaimer.

(21) Appl. No.: 12/829,591

(22) Filed: Jul. 2, 2010

(65) Prior Publication Data

US 2011/0001615 A1    Jan. 6, 2011

(30) Foreign Application Priority Data

Jul. 6, 2009   (FR) ..................................... 09 54633

(51) Int. Cl.
*G06K 9/00* (2006.01)
(52) U.S. Cl. .......................... 382/104; 340/436; 348/148
(58) Field of Classification Search .......................... None
See application file for complete search history.

(56) References Cited

U.S. PATENT DOCUMENTS

2008/0199050 A1    8/2008   Koitabashi
2009/0268946 A1*  10/2009   Zhang et al. ................... 382/104

FOREIGN PATENT DOCUMENTS

EP           1959675 A2    8/2008

OTHER PUBLICATIONS

Abramson et al.; "Hardware-Friendly Pedestrian Detection and Impact Prediction". Intelligent Vehicles Symposium, 2004 IEEE, Parma, Italy Jun. 14-17, 2004, Piscataway, NJ, USA, IEEE LKND-DOI: 10.1109/IVS.2004.1336450, pp. 590-595. Jun. 14, 2004.
Beauchemin et al.; "The Computation of Optical Flow". University of Western Ontario—ACM Computing Surveys, vol. 27, No. 3. Sep. 1995.
Benhimane et al.; Real-time image-based tracking of planes using efficient second-order minimization:, IEEE/RSJ International Conference on Intelligent Robots Systems, Sendai, Japan. 2004.
Christogiannopoulos et al.; "Segmentation of Moving Objects from Cluttered Background Scenes Using a Running Average Model". SPIE Journal, vol. 5822, pp. 13-20. 2005.
Cortes et al.; "SVM Method (Support-Vector Machine)"—published by Kluwer Academic Publishers, Boston and written by Corinna Cortes and Vladimir Vapnik. 1995.

(Continued)

*Primary Examiner* — Andrew W Johns
*Assistant Examiner* — Siamak Harandi
(74) *Attorney, Agent, or Firm* — Jacox, Meckstroth & Jenkins

(57) ABSTRACT

An obstacle detection procedure and detection device within the area surrounding a motor vehicle featuring the following: to define at least one first region of interest by carrying out a first detection of an obstacle by shape recognition in an acquired image of this environment; to define at least one second region of interest by carrying out a second detection of an obstacle by movement detection in relation to the vehicle on a sequence of acquired images of this environment; to classify the detected obstacle with, respectively, a first and second index of confidence applied to the first and second regions of interest in relation to given characteristics; and to validate the classification of the object detected in relation to these indices of confidence and in relation to these regions of interest resulting in validated regions of interest.

15 Claims, 23 Drawing Sheets

OTHER PUBLICATIONS

Dalal et al.; "Human Detection Using Oriented Historgrams of Flow and Appearance". Computer Vision—ECCV 2006 Lecture Notes in Comptuer Science; LCNS, Springer, Berlin, DE, pp. 428-441. Jan. 1, 2006.

Enzweiler et al.; "Monocular Pedestrian Recognition Using Motion Parallax", Intelligent Vehicles Symposium, 2008 IEEE, IEEE Piscatawa, NJ, USA; pp. 792-797. Jun. 4, 2008.

Gandhi T et al.; "Pedestrian Protection Systems: Issues, Survey, and Challenges". IEEE Transactions on Intelligent Transportation Systems, IEEE Service Center, Piscataway, NJ, US LNKD-DOI:10. 1109/TITS.2007.903444, vol. 8, No. 3, pp. 413-430. Sep. 1, 2007.

Lucas et al.; "An Iterative Image Registration Technique with an Application to Stereo Vision", IJCAI, pp. 674-679. 1981.

Meir et al.; "An Introduction to Boosting and Leveraging", Department of Electrical Engineering, Technion, Haifa 32000 Israel / Research School of Information Science & Engineering—the Australian National University, Canberra, Act 0200, Australia. 2003.

Munder et al.; "Pedestrian Detection and Tracking Using a Mixture of View-Based Shaped Texture Models", IEEE Transactions on Intelligent Transportation Systems, IEEE Service Center, Piscataway, NJ, US, vol. 9, No. 2, pp. 333-343. Jun. 1, 2008.

Paletta et al.; "Bayesian Decision Fusion for Dynamic Multi-Cue Object Detection". Proc. Indian Conference on Computer Vision, Graphics and Image Processing. Dec. 16-18, 2002.

Schiele et al.; "Visual People Detection—Different Models, Comparison and Discussion". Proc. IEEE ICRA 2009, Workshop on People Detection and Tracking. May 2009.

Szarvas et al.; "Real-Time Pedestrian Detection Using LIDAR and Convolutational Neural Networks". Intelligent Vehicles Symposium, 2006 IEEE Meguro-Ku, Japan, Jun. 13-15, 2006, Piscataway, NJ, USA, IEEE LKND-DOI:10.1109/IVS.2006.1689630, pp. 213-218. Jun. 13, 2006.

Viola et al.; "Detecting Pedestrians Using Patterns of Motion and Appearance". International Journal of Computer Vision, Kluwer Academic Publishers, BO LNKD-DOI:10.1007/S11263-005-6644-8, vol. 63, No. 2, pp. 153-161. Jul. 1, 2005.

* cited by examiner

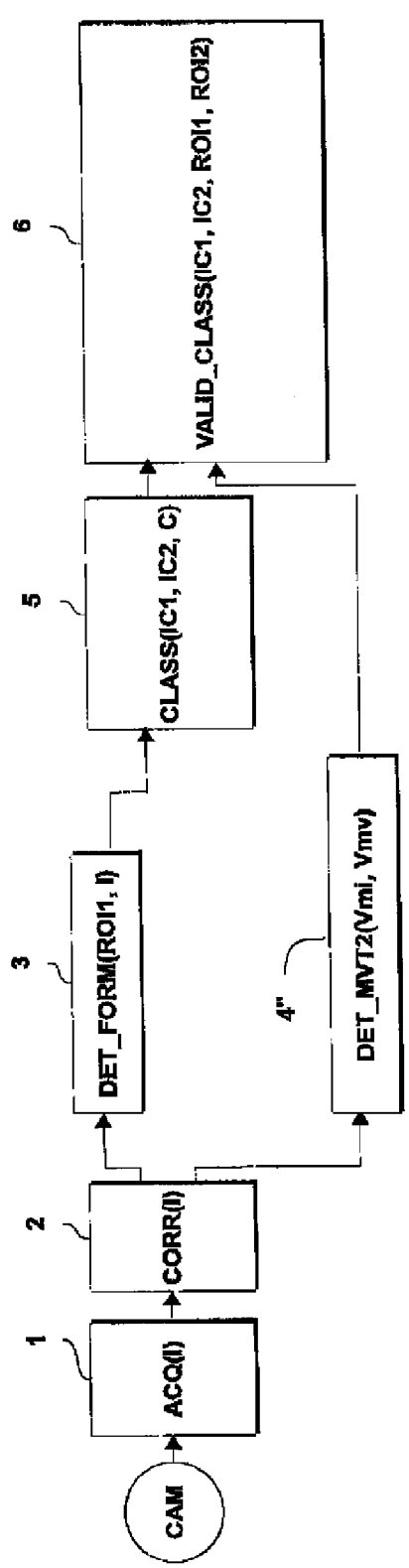
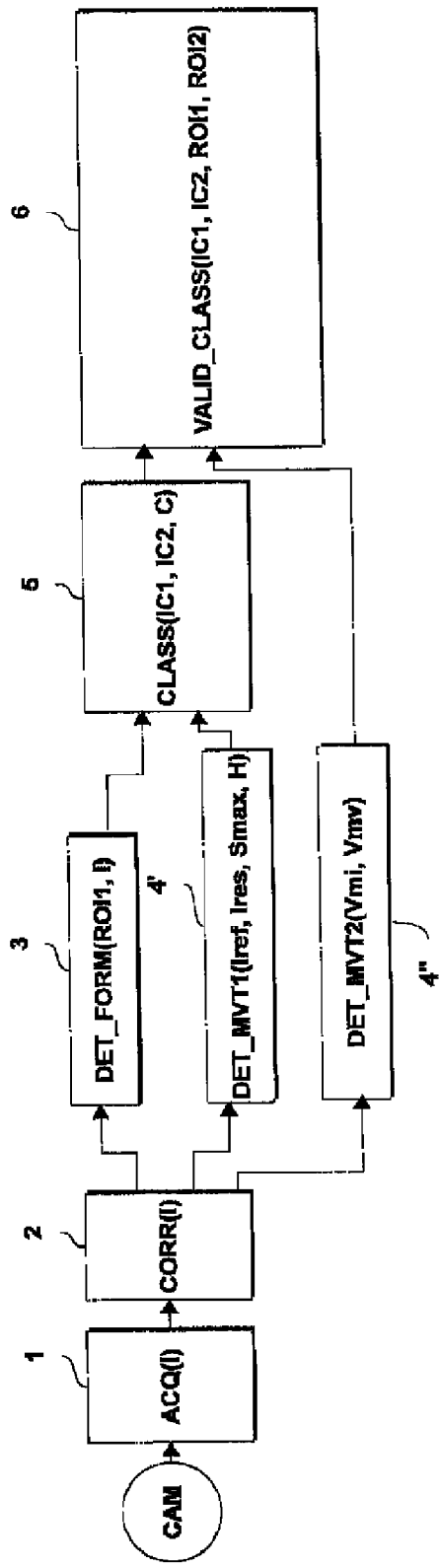

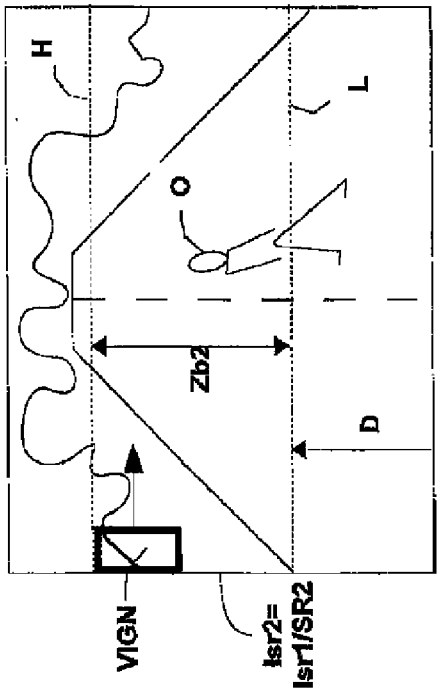
FIG.9
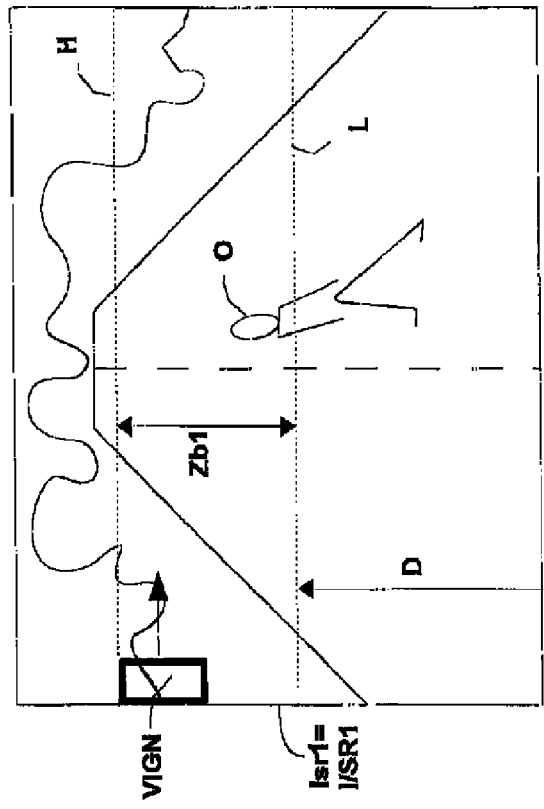
FIG.10
FIG.11
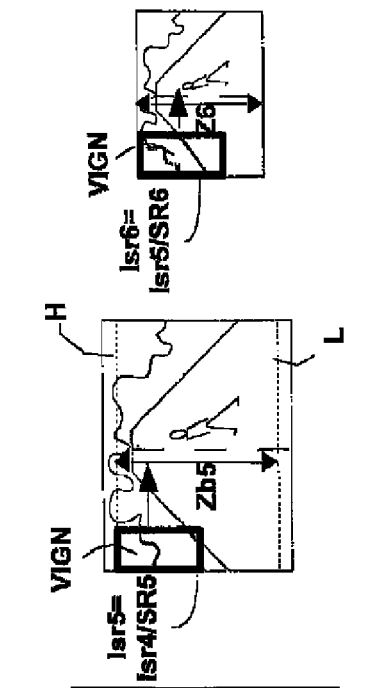
FIG.14
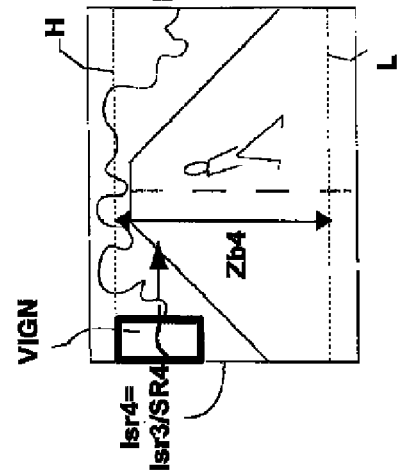
FIG.13
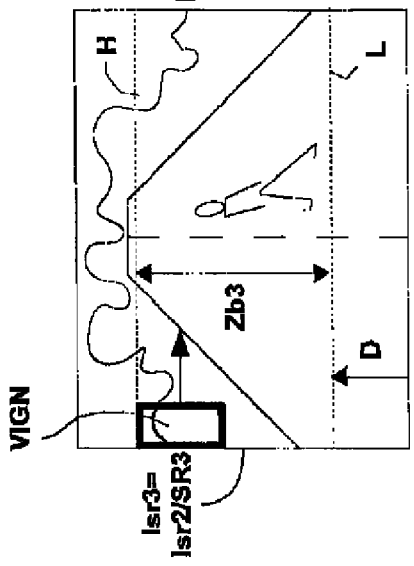
FIG.12

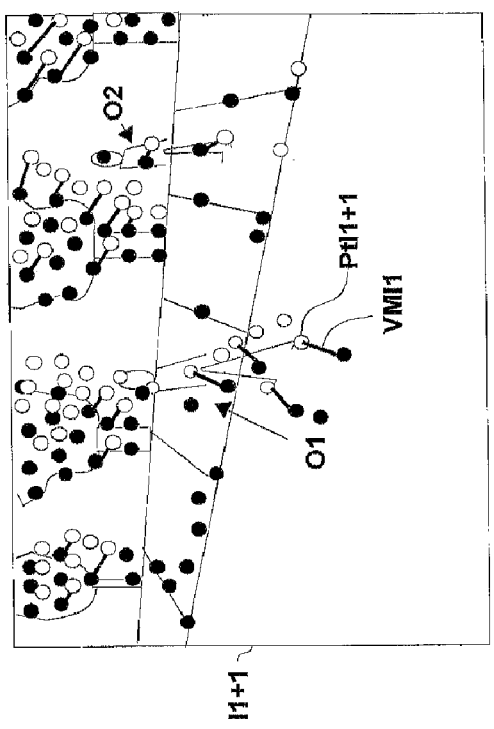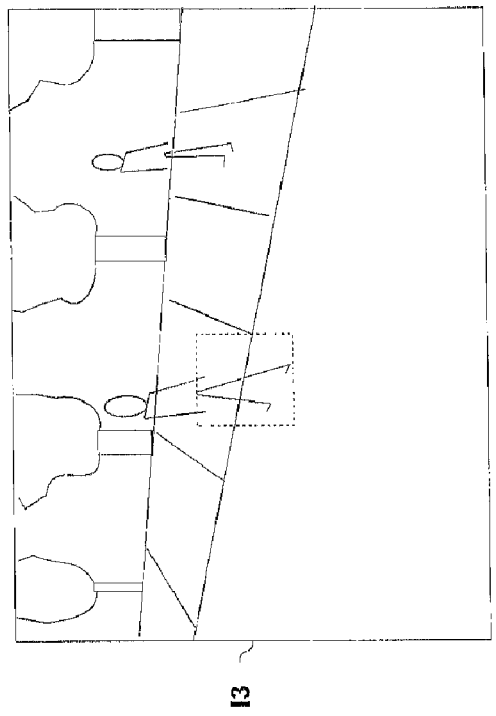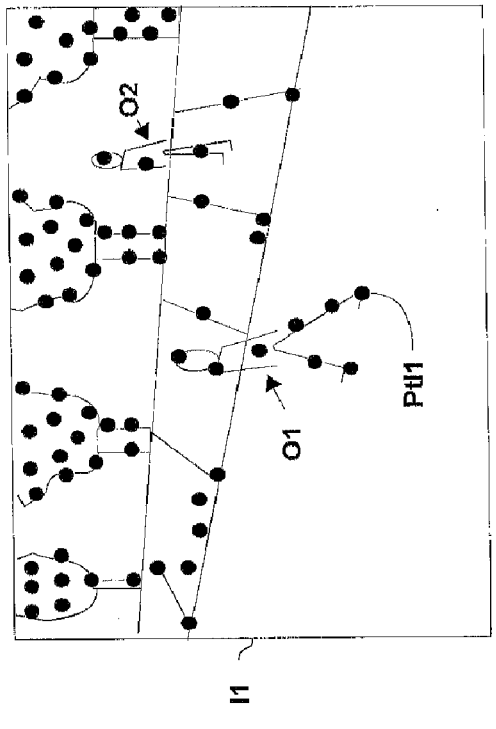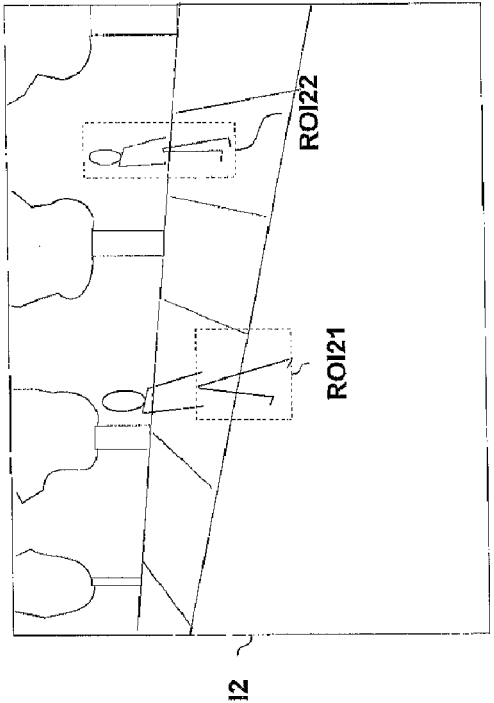

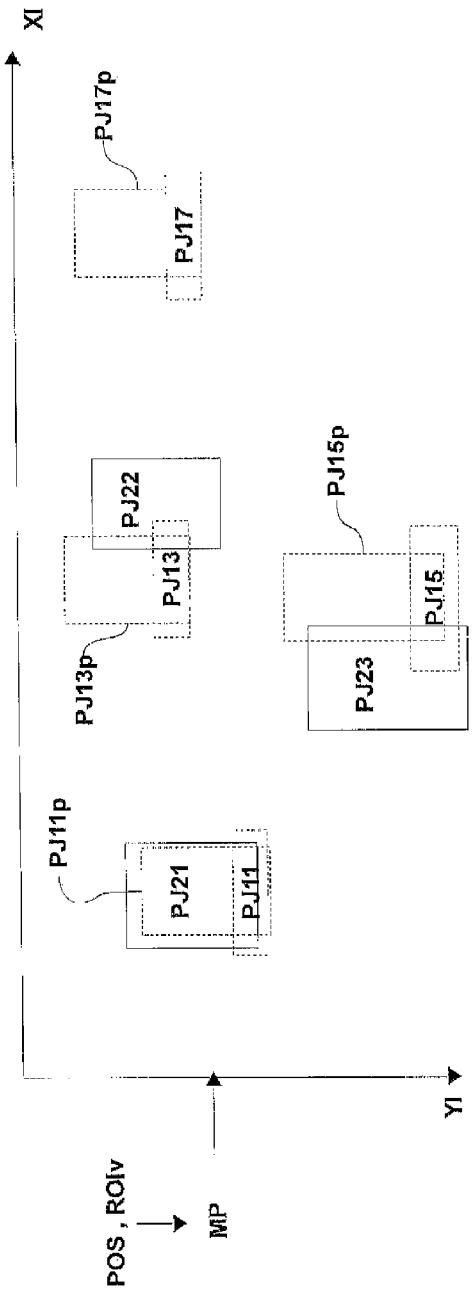
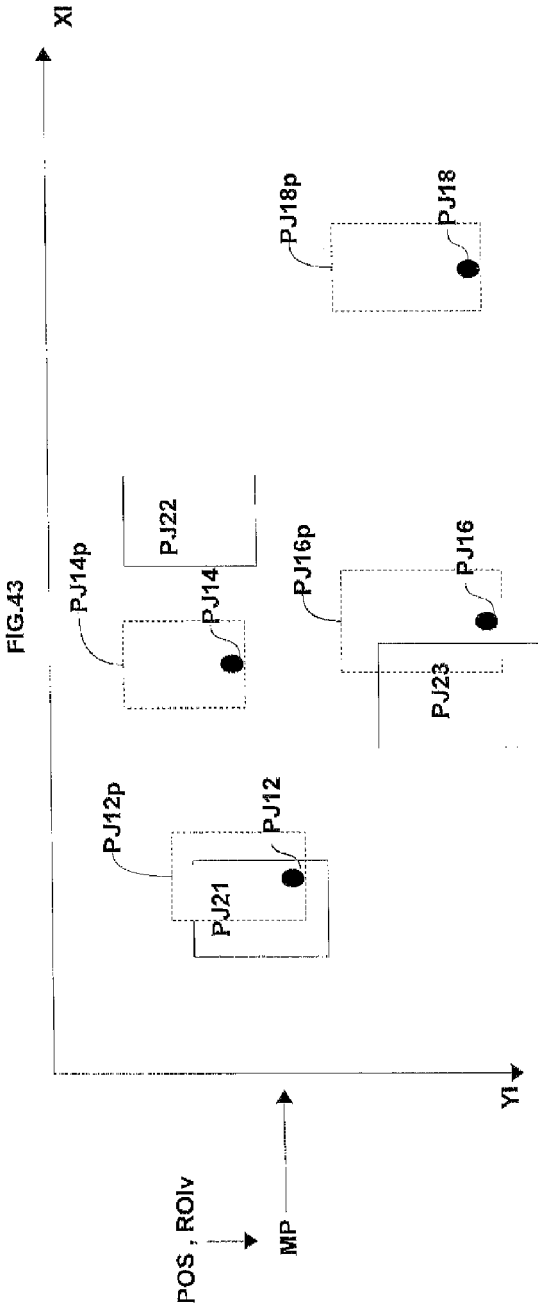

OBSTACLE DETECTION PROCEDURE FOR MOTOR VEHICLE

CROSS-REFERENCE TO RELATED APPLICATIONS

This application claims priority to French Application No. 0954633 filed Jul. 6, 2009, which application is incorporated herein by reference and made a part hereof.

BACKGROUND OF THE INVENTION

1. Field of the Invention

The present invention concerns an obstacle detection procedure within the area surrounding a motor vehicle.

It also concerns a commissioning device of the procedure.

It is particularly applied in the field of motor vehicles.

2. Description of the Related Art

In the field of motor vehicles, a known state of the technique of an obstacle detection procedure within the area surrounding a motor vehicle, involves the following stages:

detection of an obstacle;

classification of the detected vehicle according to a category of dangerousness in accordance with its displacement speed and its position in relation to the axis of the vehicle considered; and dispatch of the classification to an element of measurement of dangerousness.

One disadvantage of this state of the technique is that this detection is difficult to apply to the detection and classification of a pedestrian.

SUMMARY OF THE INVENTION

The present invention aims to provide an obstacle detection procedure within the area surrounding a motor vehicle, which makes it possible to precisely detect not only vehicles but also pedestrians.

According to a first object of the invention, this aim is achieved by an obstacle detection procedure within the area surrounding a motor vehicle, featuring the fact that it involves the following stages:

to define at least one first region of interest by carrying out a first detection of an obstacle by shape recognition in an acquired image of this environment;

to define at least one second region of interest by carrying out a second detection of an obstacle by movement detection in relation to the vehicle on a sequence of acquired images of this environment;

to classify the detected obstacle with, respectively, a first and second index of confidence applied to the first and, second regions of interest in relation to given characteristics; and to validate the classification on the object detected in relation to these indices of confidence and in relation to these regions of interest resulting in validated regions of interest.

As one will see in detail hereinafter, the fact of combining detection by shape and movement recognition will make it possible to detect and firmly locate an obstacle, and the fact of applying, to these detections, probabilities of belonging to a category by means of indices of confidence, will make it possible to reinforce pedestrian detection.

According to modes of completion without limitations, the detection procedure may involve, moreover, one or more further characteristics among the following:

the detection procedure also involves the further stages of:

carrying out a third obstacle detection by sensor/s with detection range below a first threshold resulting in a determined position;

projecting the determined position into a reference marker;

projecting the validated regions of interest in this reference marker; and aligning the two projections obtained and attributing a determined position to the obstacle classified in accordance with the alignment.

Detection by active sensors (distance sensor) makes it possible to refine the localization of detected obstacles on an acquired image of the environment of the vehicle.

The reference marker is the image marker. This makes it possible to minimize the impact of distance estimation errors from the regions of interest in the vehicle marker.

The first detection by shape recognition involves the following sub-stages:

constructing a pyramid of images by recursive sub-sampling of an acquired image;

for each sub-sampled image:

scan this image with a label representing a certain obstacle;

at each successive position of a label in this image, analyze its content by means of a set of classifiers, these classifiers being determined during a phase of prior apprenticeship.

This makes it possible to detect obstacles according to the detection distances at which they are situated in an image. The result of the application of the classifiers makes it possible to determine if an obstacle is situated in a label, and thus detect it. Label means, in the present application, the detection zone in the image. This detection zone is of a certain size and shape. Of course, it is possible to give it different shapes. The system according to the present invention proceeds to obstacle detection within the limits of this label. According to one variant of completion, the label represents the obstacle to be detected in that it corresponds approximately to the surface that this type of obstacle will occupy in the image. For example, in order to detect a pedestrian, one can take a rectangular shape the large side of which is vertical. Thus, any pedestrian whose image is within this rectangle will be detected.

The first detection by shape recognition also involves a further sub-stage to determining a scanning zone in a sub-sampled image. This reduces the number of processing operations.

A second movement detection involves the following sub-stages:

constructing a background image recalculated for each image of a sequence of images;

taking out the background image to the current image in the sequence of images, resulting in a resulting image;

discriminating movements determined in the resulting image according to a threshold; and extracting second regions of interest from the discrimination.

This makes it possible to obtain obstacles in movements that do not belong to the background.

A second movement detection involves the following sub-stages:

determining points of interest on an acquired image;

following these points of interest on the next image and determining their displacement;

regrouping into second regions of interest these points of interest having a similar displacement;

determining the displacement of the vehicle; and discriminating second regions of interest having a movement in the image which does not result from the displacement of the vehicle.

The classification stage involves the following sub-stages:

creating a vector of characteristics from the regions of interest;

classifying this vector of characteristics by comparison with a border of decision determined previously during an apprenticeship stage; and determining an associated index of confidence according to the distance of the vector of characteristics in relation to this border of decision.

This makes it possible to associate to the classified region of interest an index of confidence representing the certainty of belonging to a class.

The vector of characteristics is a histogram of the orientated gradients of a region of interest.

The use of histograms is simple and quick to commission.

The validation stage involves the following sub-stages:

constructing a probability card corresponding to an image in which each classified region of interest is represented by a distribution of probability;

accumulating these distributions of probability which tally in the probability card in order to obtain a local maximum; and validating the region of interest which is closer to each local maximum of the probability card.

The use of a probability card is simple and quick to commission. This makes it possible to accumulate the probabilities on regions likely to represent a pedestrian.

Detection by sensor/s is carried out by means of ultrasound sensors. This gives a cover of detection close to the vehicle.

Detection by sensor/s is carried out by means of radar sensors. This gives a cover of detection further from the vehicle.

The detection procedure also involves a further stage of applying a change of perspective to an acquired image. This makes it possible to reduce distortions in the acquired image, particularly on obstacles which are situated at the border of an image.

The detection procedure also involves a further stage of follow-up of validated regions of interest on a sequence of acquired images. This makes it possible to confirm the presence of a so-called validated region of interest and smooth its position over a whole sequence of images.

According to a second object of the invention, this concerns a detection device of an obstacle within the area surrounding a motor vehicle, featuring the fact that it is fit to:

to define at least one first region of interest by carrying out a first detection of an obstacle by shape recognition in an acquired image of this environment;

to define at least one second region of interest by carrying out a second detection of an obstacle by movement detection in relation to the vehicle on a sequence of acquired images of this environment;

to classify the detected obstacle with, respectively, a first and second index of confidence applied to the first and second regions of interest in relation to given characteristics; and to validate the classification of the object detected in relation to these indices of confidence and in relation to these regions of interest resulting in validated regions of interest.

According to a mode of completion without limitation, the detection device is, moreover, fit to:

carry out a third obstacle detection by sensor/s with detection range below a first threshold resulting in a determined position;

project the determined position into a reference marker;

project the validated regions of interest into this reference marker; and align the two projections obtained and attribute a determined position to the obstacle classified in accordance with the alignment.

According to a third object of the invention, this concerns a computer program product including one or more sequences of instructions executable from an information processing unit, the execution of these sequences of instructions allowing the procedure to be commissioned according to any one of the previous characteristics.

The invention and its different applications will be better understood by reading the following description and examining the figures which accompany it.

These are only presented by way of indication and in no way limit the invention.

BRIEF DESCRIPTION OF THE ACCOMPANYING DRAWINGS

FIG. 3 is an organization chart of the first mode of completion without limitation of the detection procedure of FIG. 1 in which is illustrated a movement detection stage according to a second mode of completion without limitation;

FIG. 4 is an organization chart of the first mode of completion without limitation of the detection procedure of FIG. 1 in which is illustrated a movement detection stage combining the first mode of completion of FIG. 2 and the second mode of completion of FIG. 3;

FIGS. 9 to 16 illustrate in diagram form certain images used by a stage of detection by shape recognition of the detection procedure of FIGS. 1 to 4;

Figure 20:
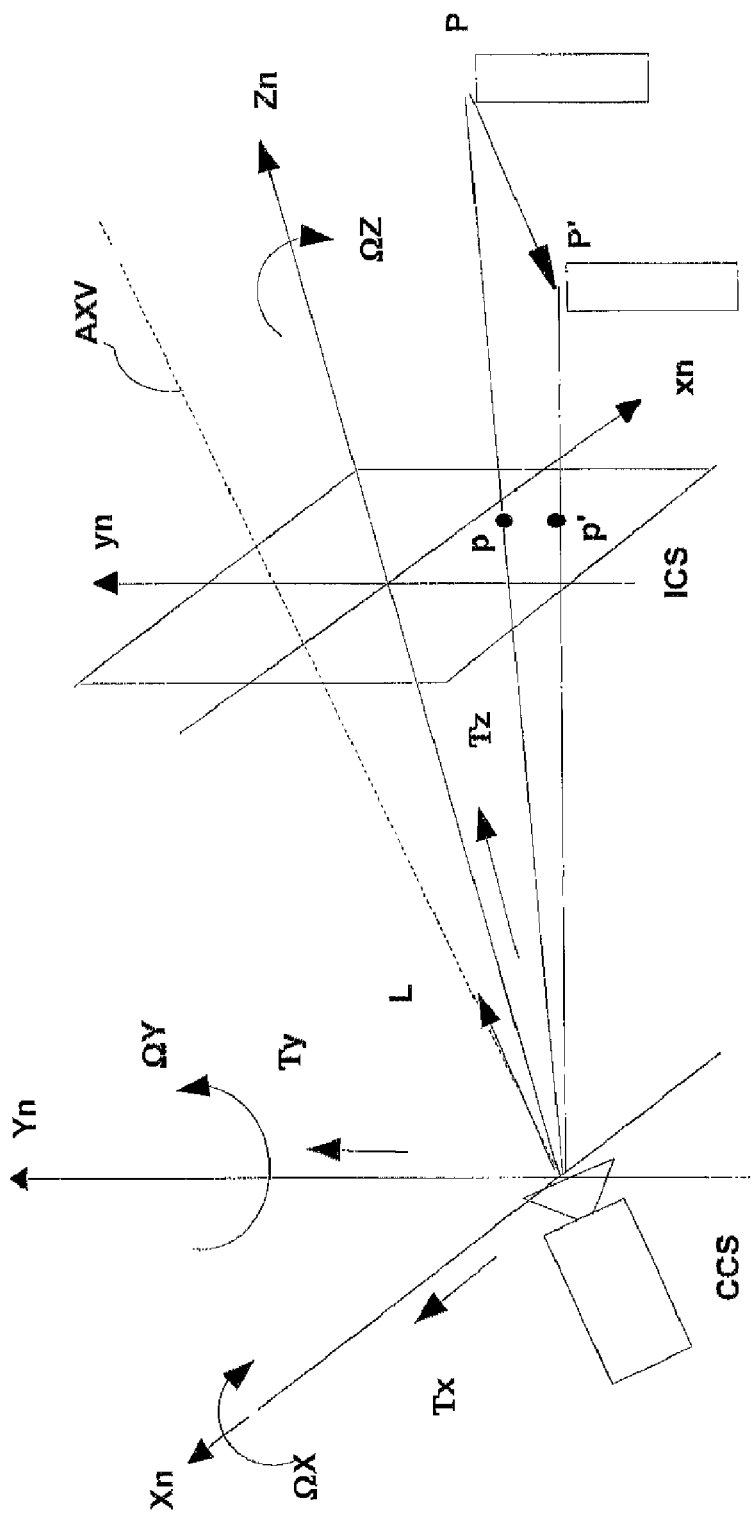
Figure 25:
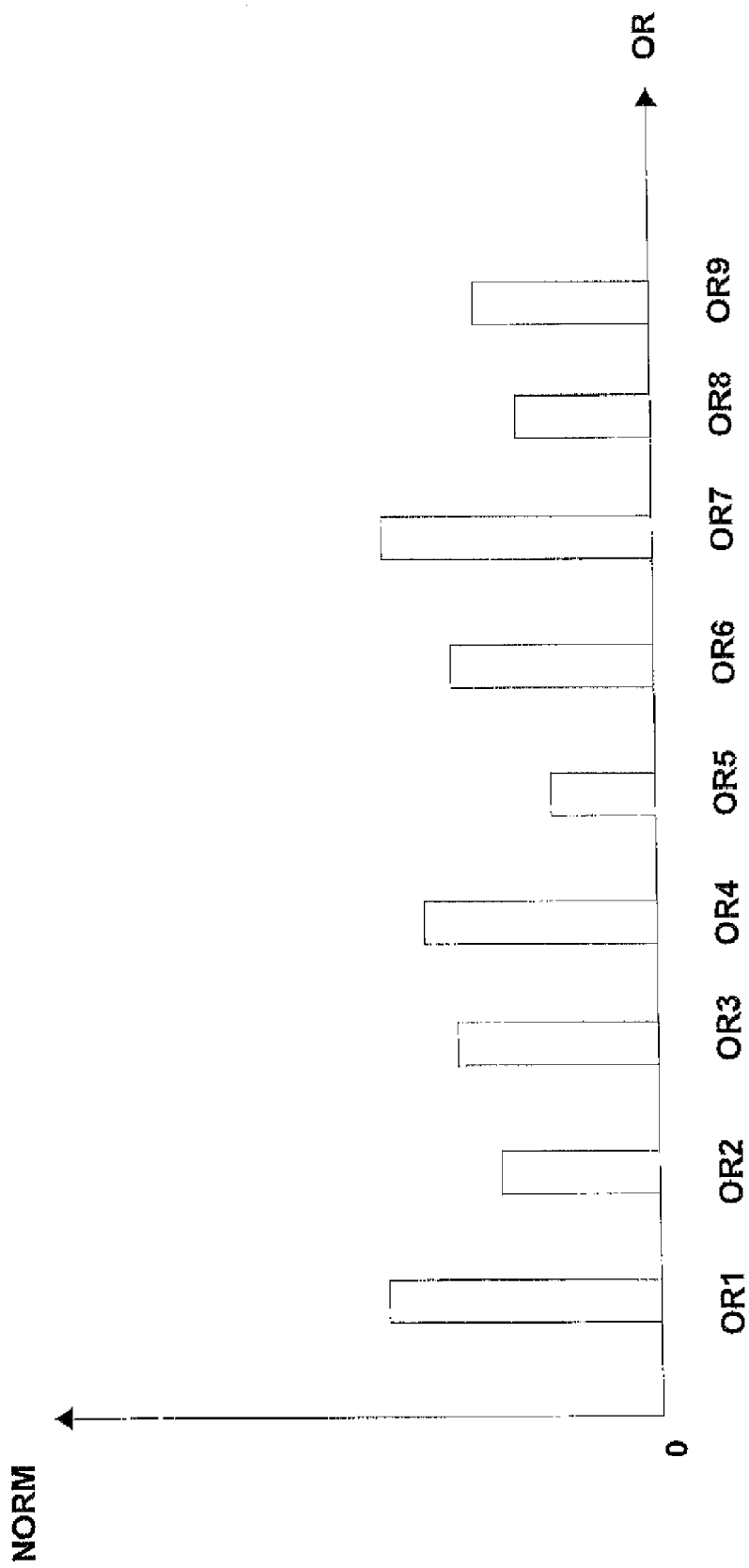
Figure 27:
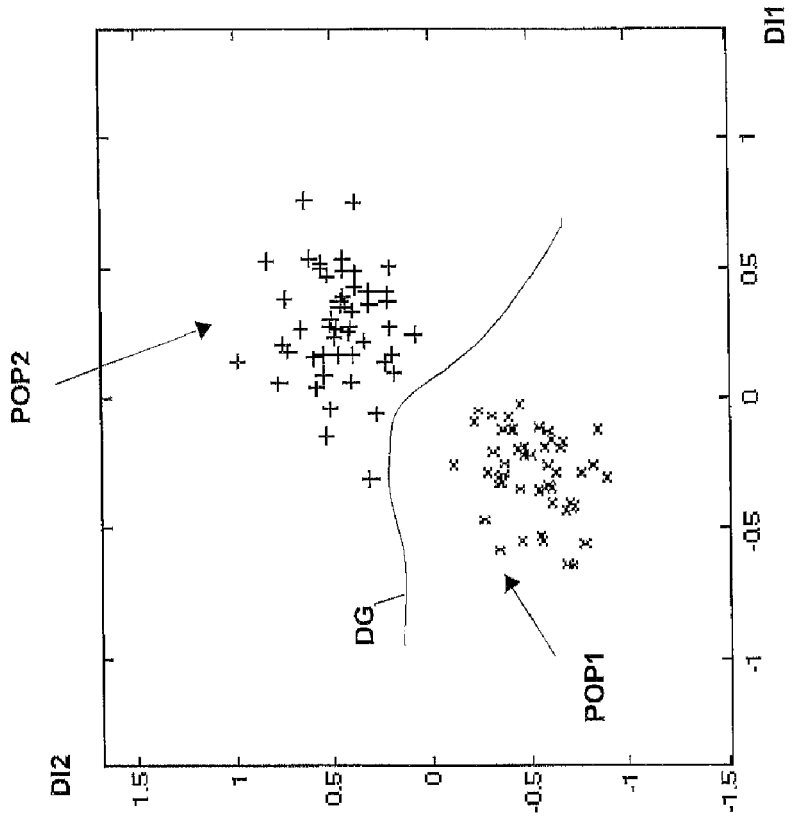
Figure 26:
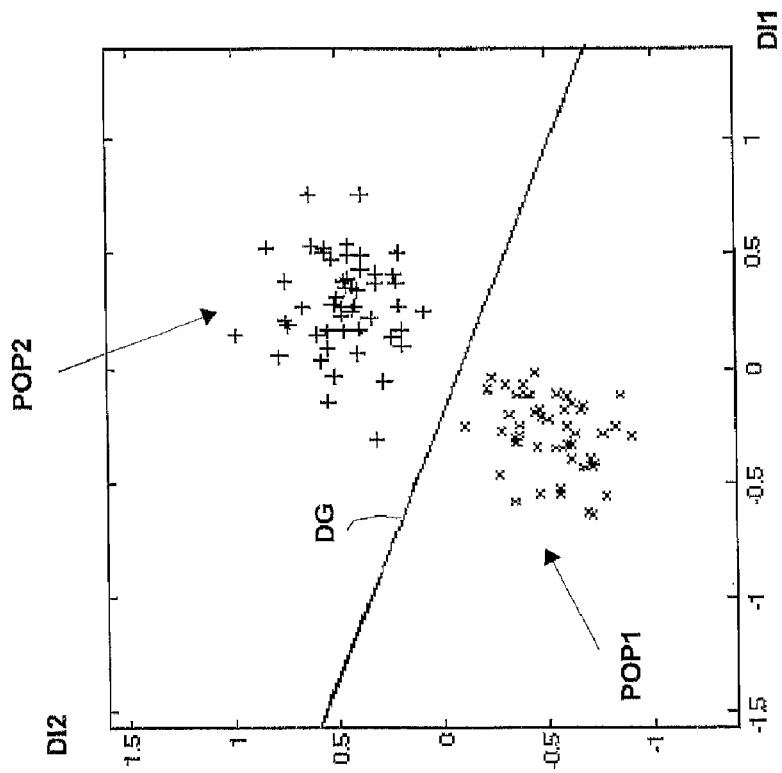
Figure 28:
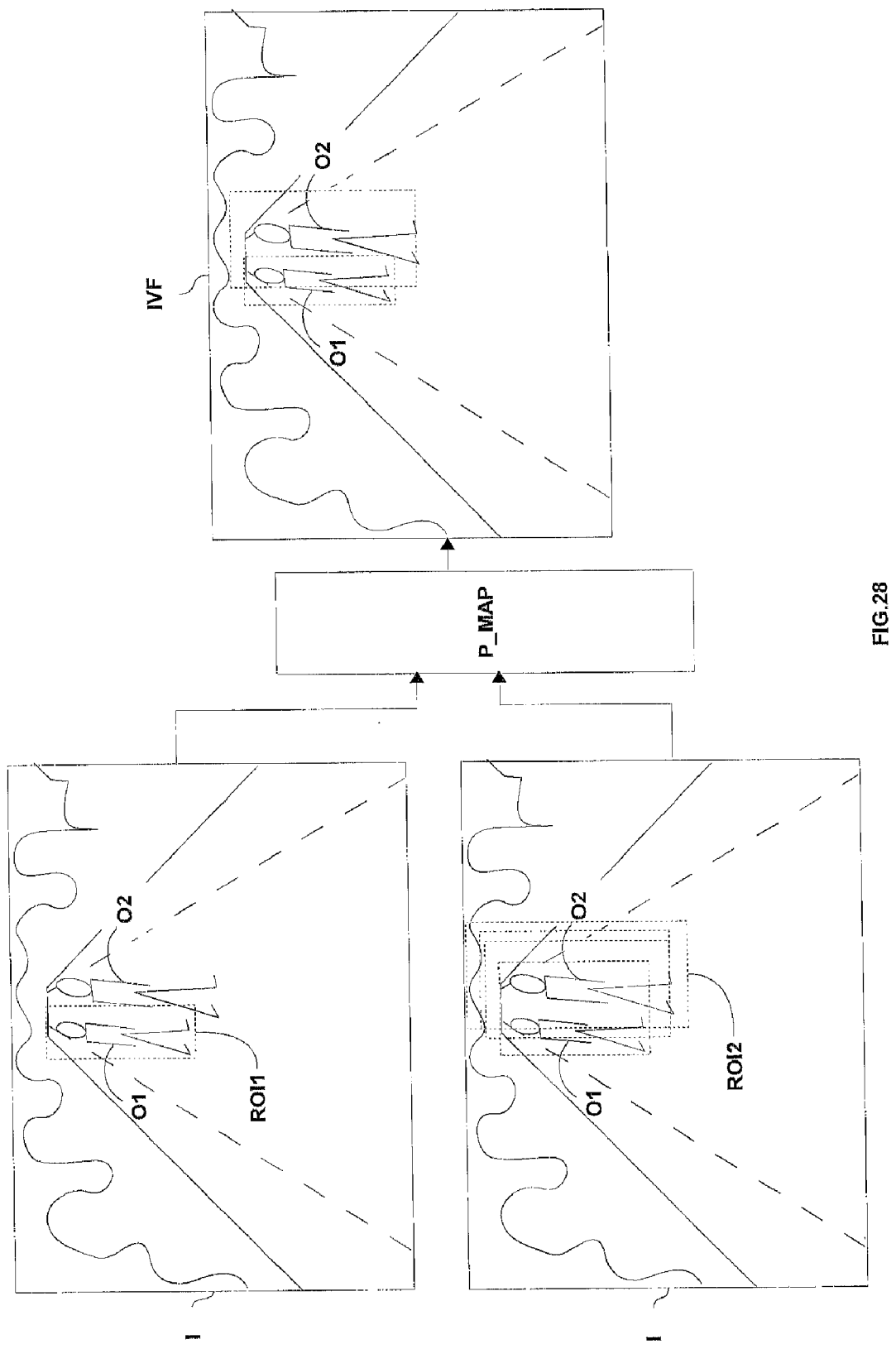
Figure 30:
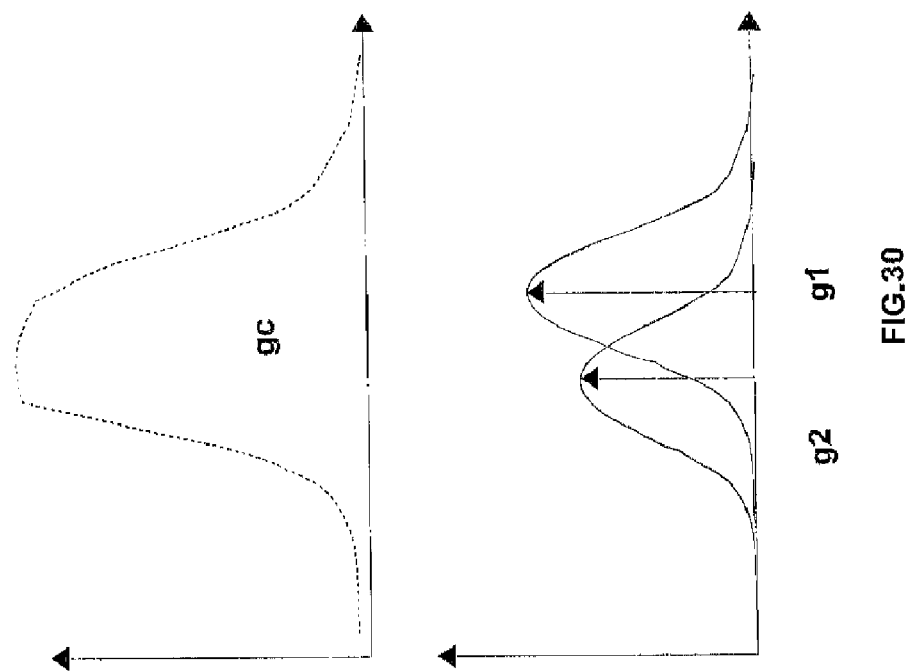
Figure 29:
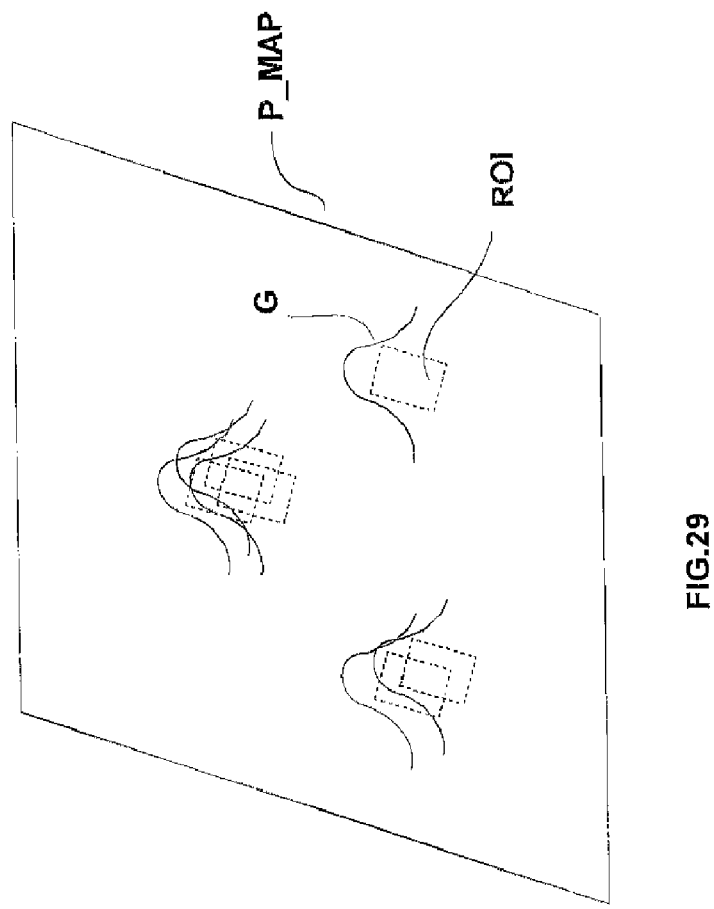
Figure 31:
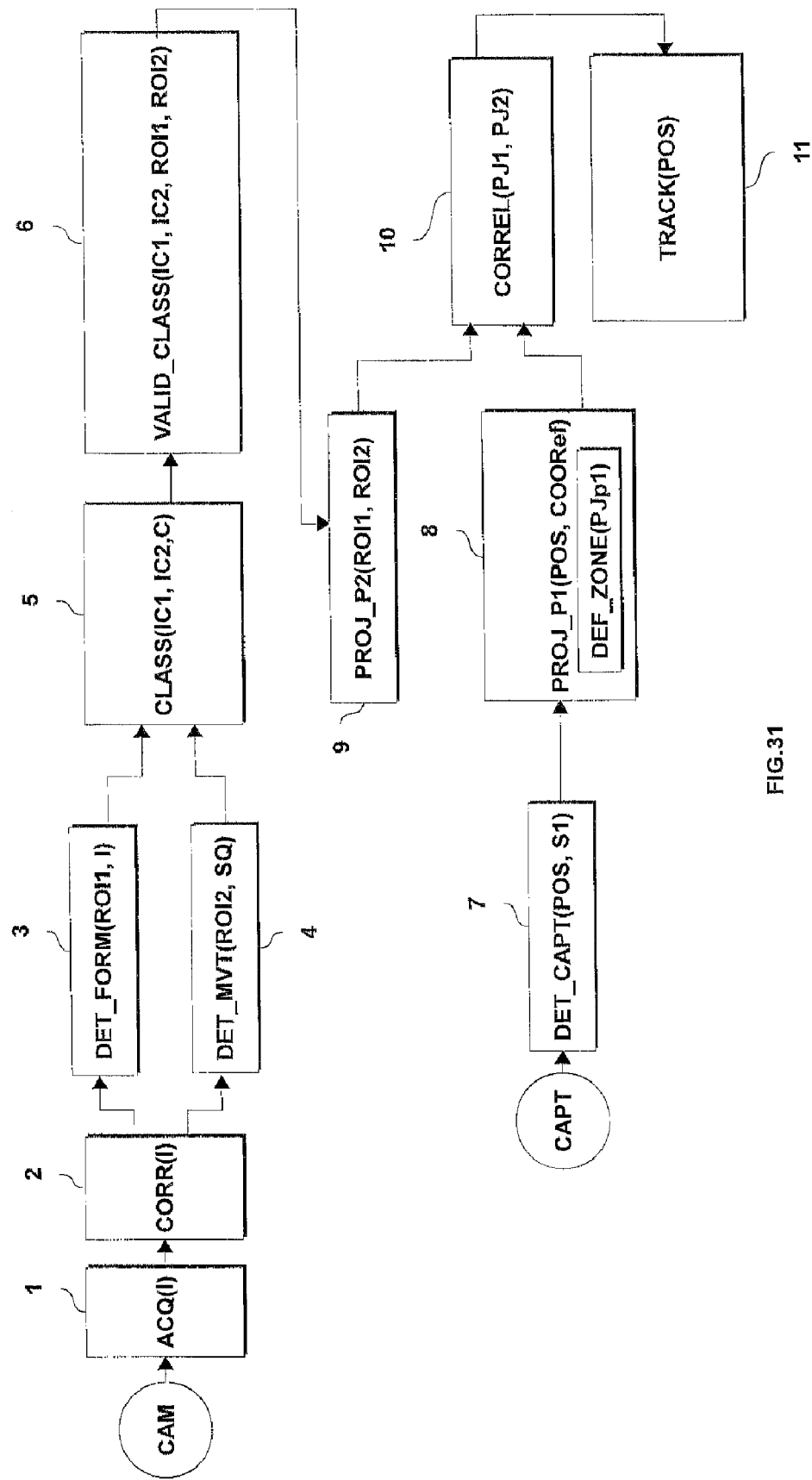
Figure 32:
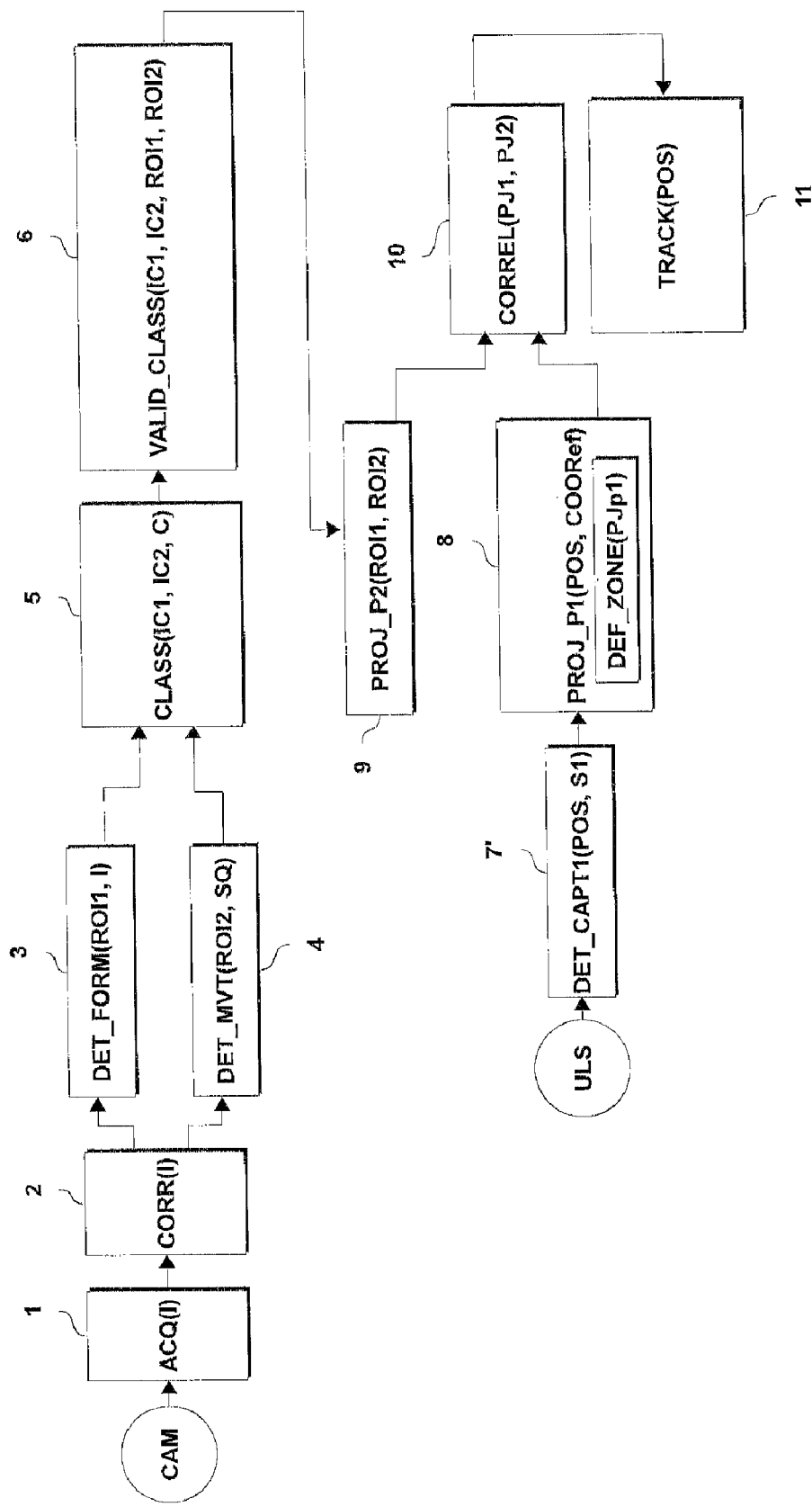
Figure 33:
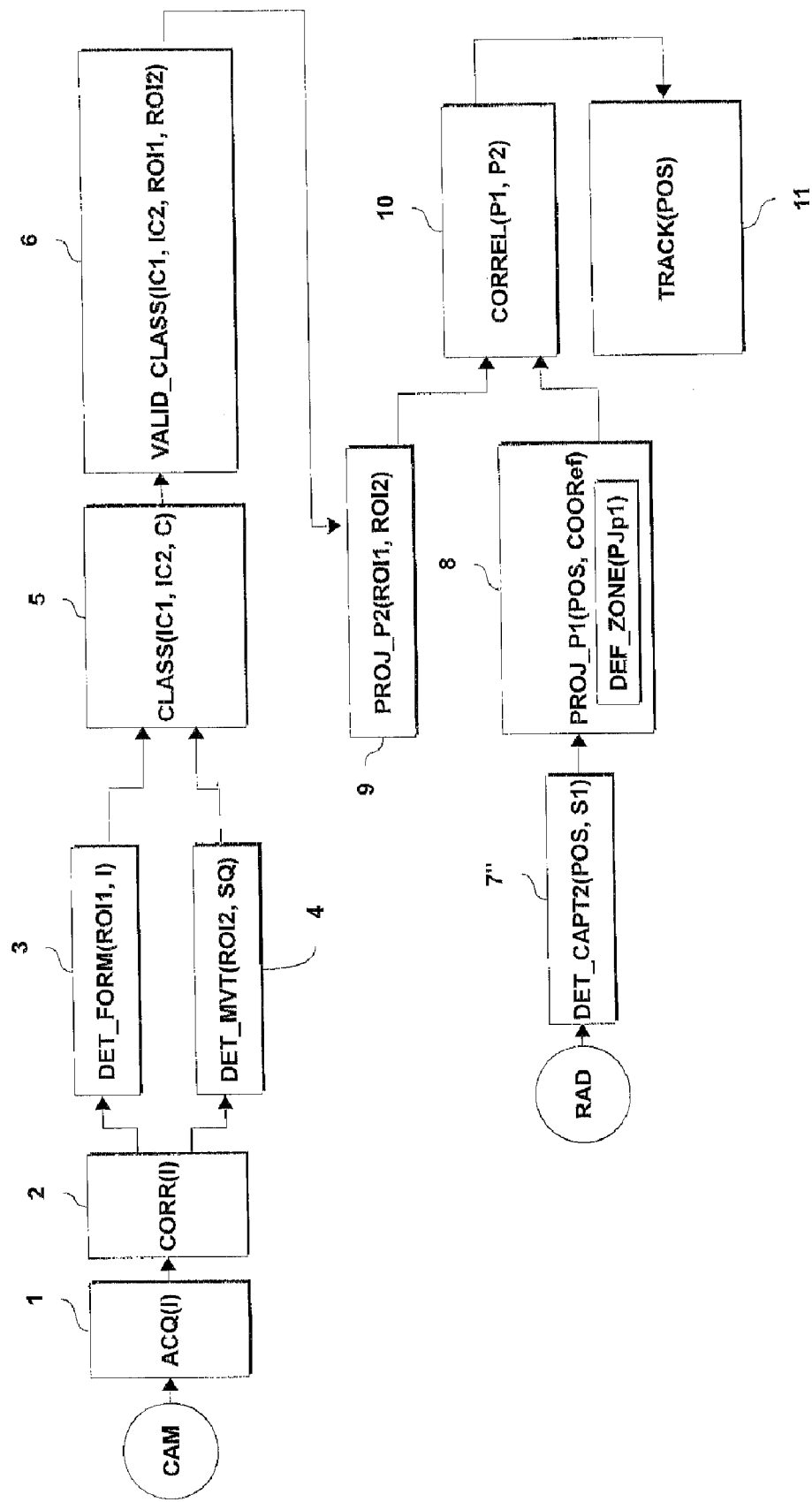
Figure 34:
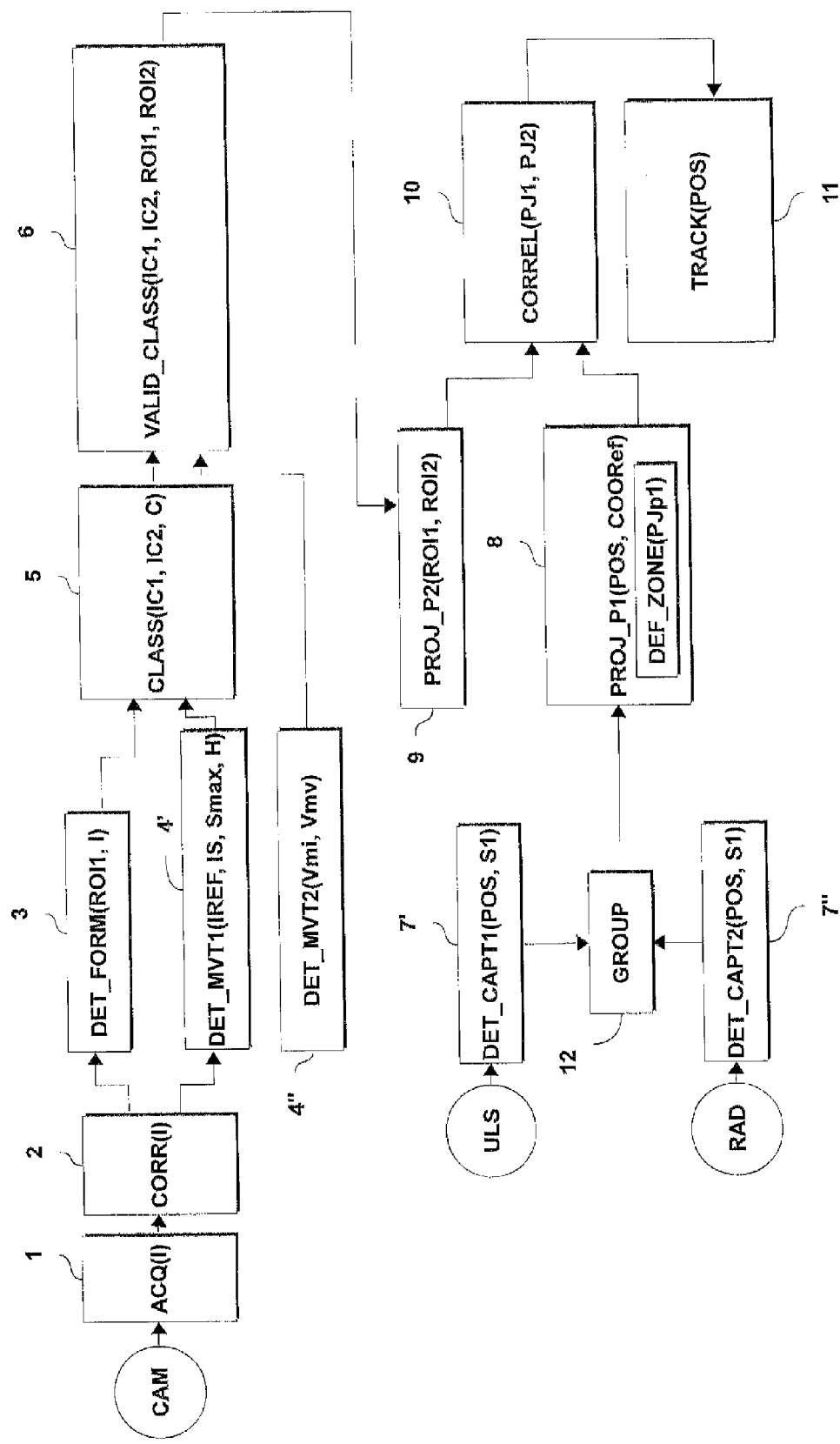
Figure 36:
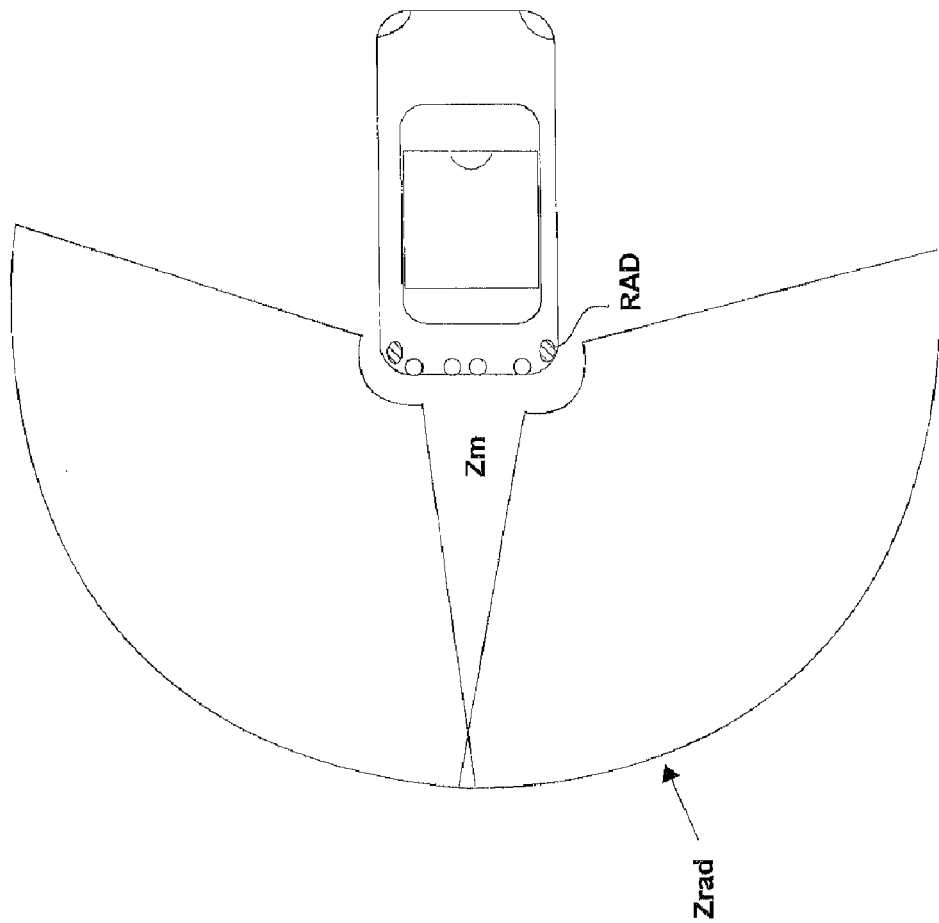
Figure 35:
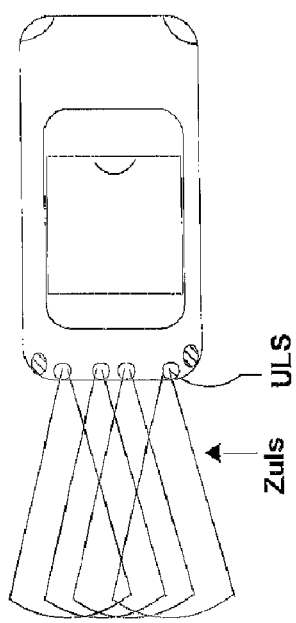
Figure 38:
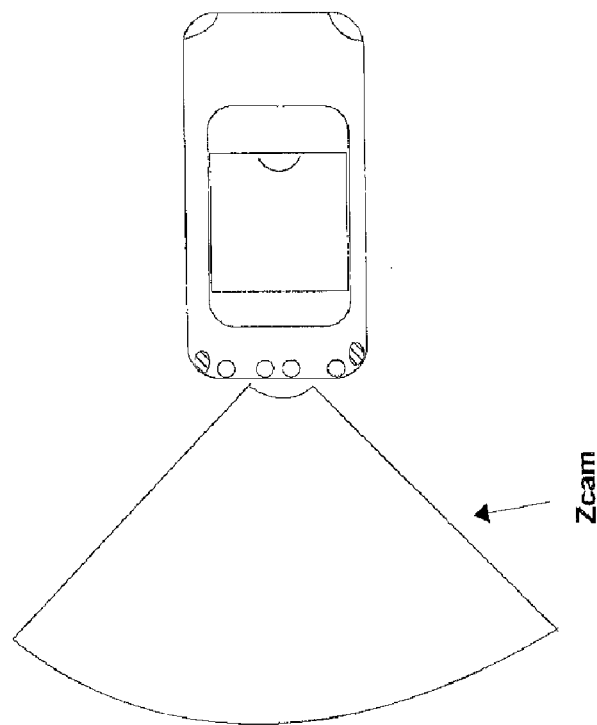
Figure 37:
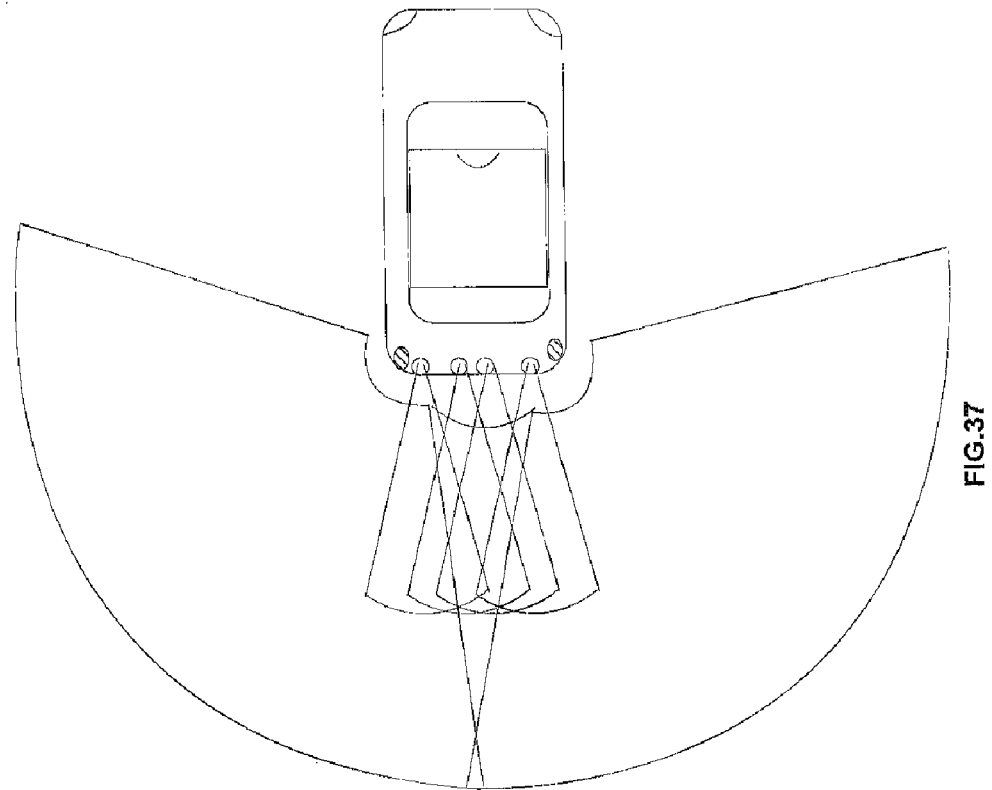
Figure 40:
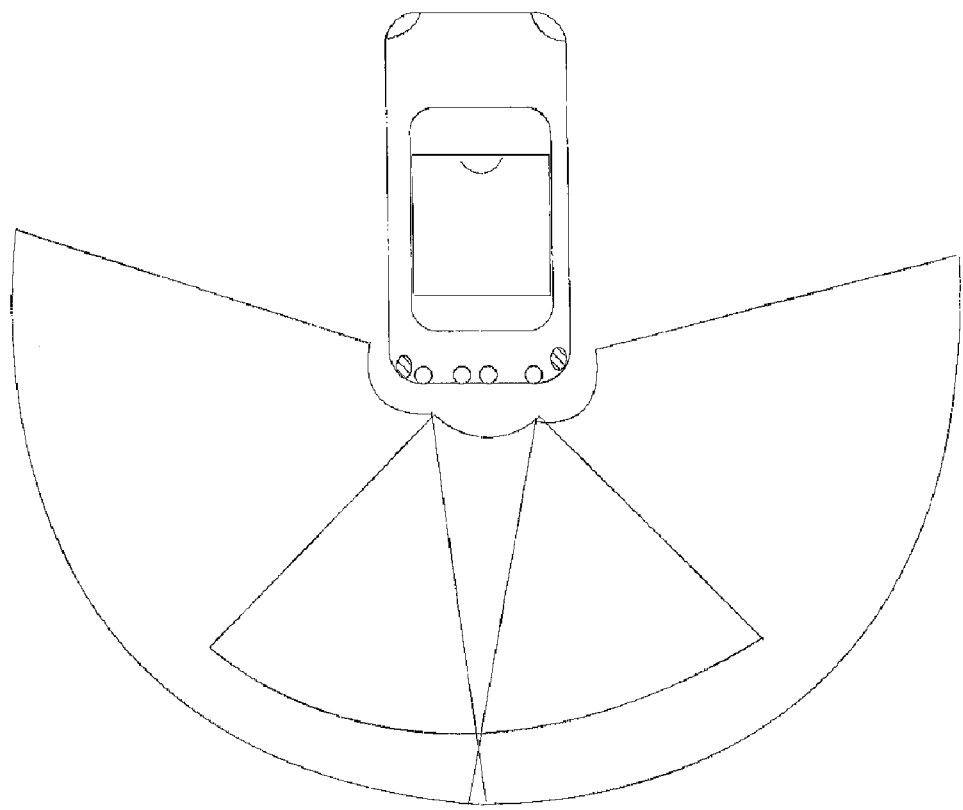
Figure 39:
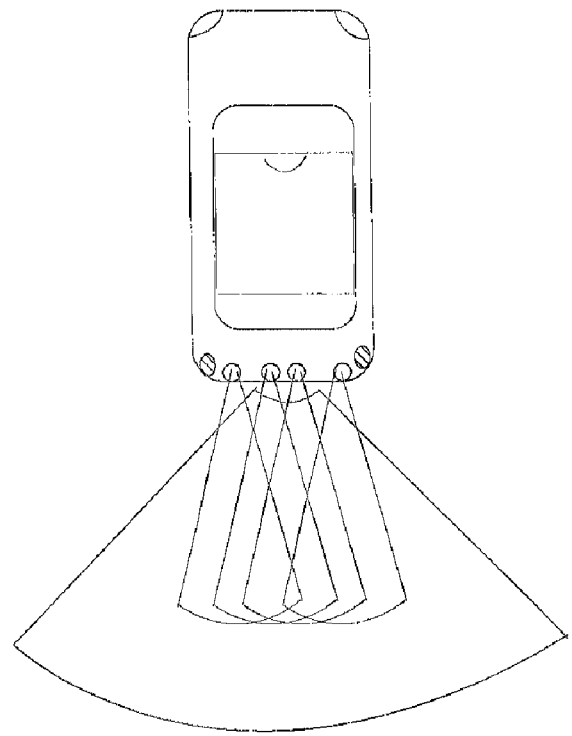
Figure 42:
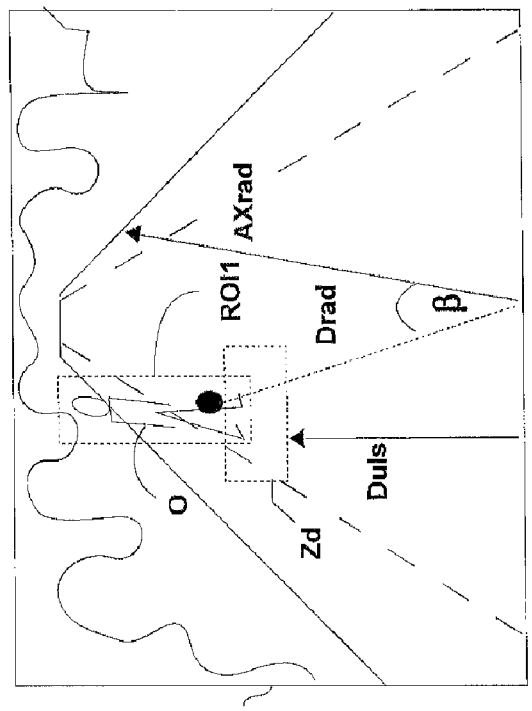
Figure 41:
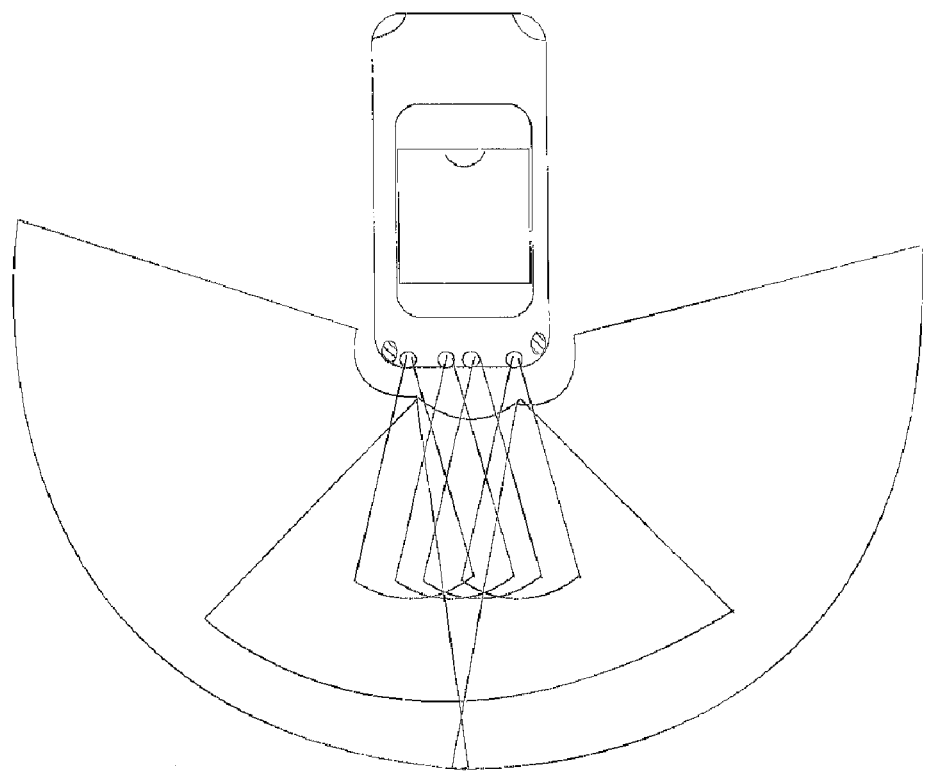
Figure 45:
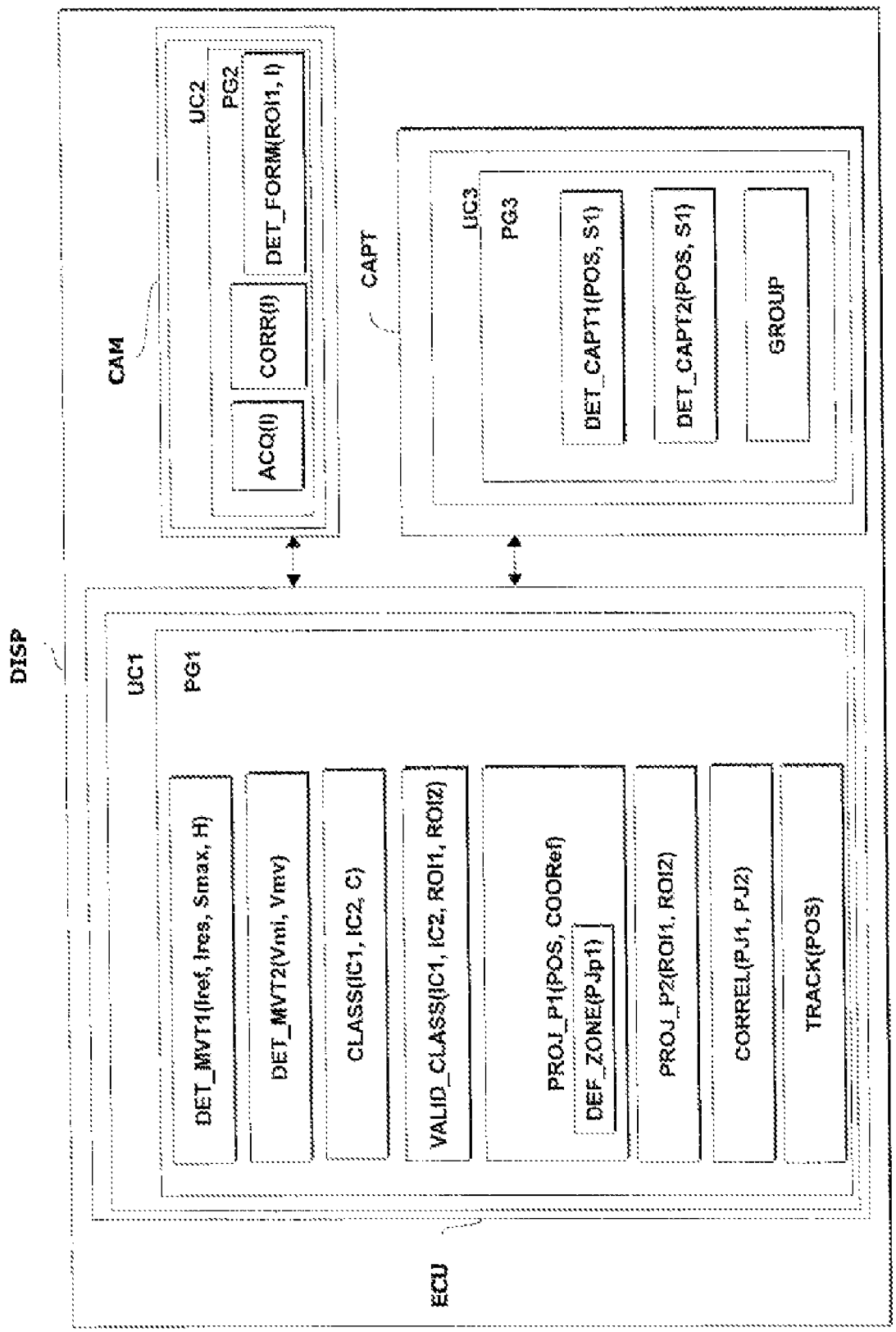

FIG. 20 illustrated the principle of a displacement of a point in the image during the displacement of a camera and used in the movement detection stages of FIGS. 21 to 24;

FIGS. 21 to 24 illustrate in diagram form certain images used by a second mode of completion without limitation of a movement detection stage of the detection procedure of FIGS. 1, 3 and 4, 5;

FIG. 25 represents in diagram form a histogram of orientated gradients used by a mode of completion without limitation of an obstacle classification stage of the detection procedure of FIGS. 1 to 4;

FIGS. 26 and 27 are diagrams of spreading the index of confidence which explains a mode of completion without limitation of an obstacle classification stage of the detection procedure of FIGS. 1 to 4;

FIG. 28 is a diagram which explains a mode of completion without limitation of a validation stage of a classification of obstacles of the detection procedure of FIGS. 1 to 4;

FIG. 29 is a diagrammatic 3-D representation of Gauss functions explaining their use in the validation stage of FIG. 28;

FIG. 30 is a diagrammatic 2-D representation of Gauss functions explaining their use in the validation stage of FIG. 28;

FIG. 31 is an organization chart of a second mode of completion without limitation of the detection procedure according to the invention;

FIG. 32 is an organization chart of the second mode of completion without limitation of the detection procedure of FIG. 31 illustrating a sensor-operated detection stage according to a first mode of completion without limitation;

FIG. 33 is an organization chart of the second mode of completion without limitation of the detection procedure of FIG. 31 illustrating a sensor-operated detection stage according to a second mode of completion without limitation;

FIG. 34 is an organization chart of the second mode of completion without limitation of the detection procedure of FIG. 31 illustrating a sensor-operated detection stage combining the first mode of completion of FIG. 32 and the second mode of completion of FIG. 33;

FIG. 35 illustrates in diagram form a vehicle including an ultrasound sensor-operated detection device according to a first mode of completion without limitation used by the detection procedure of FIGS. 32 and 34 and a detection zone of this detection device;

FIG. 36 illustrates in diagram form a vehicle including a radar sensor-operated detection device according to a second mode of completion without limitation used by the detection procedure of FIGS. 33 and 34 and a detection zone of this detection device;

FIG. 37 illustrates in diagram form a vehicle including detection devices by ultrasound sensors of FIG. 35 and by radar sensors of FIG. 36 and their respective detection zone;

FIG. 38 illustrates in diagram form a vehicle including an image acquisition device used by the detection procedure of FIGS. 1 to 4 and a detection zone of this acquisition device;

FIG. 39 illustrates in diagram form a vehicle including an image acquisition device of FIG. 38 and an ultrasound sensor-operated detection device of FIG. 35 as well as their respective detection zone;

FIG. 40 illustrates in diagram form a vehicle including an image acquisition device of FIG. 38 and a radar sensor-operated detection device of FIG. 36;

FIG. 41 illustrates in diagram form a vehicle including an image acquisition device of FIG. 38, an ultrasound sensor-operated detection device of FIG. 35 and a radar sensor-operated detection device of FIG. 36;

FIG. 42 illustrates an obstacle as well as parameters related to its position, detected by an ultrasound sensor-operated detection device of FIG. 35 and by a radar sensor-operated detection device of FIG. 36;

FIGS. 43 and 44 are diagrams which explains projections in a reference marker of positions and regions of interest related to detections of obstacles, these projections resulting from a projection stage of the detection procedure of FIGS. 31 to 34;

FIG. 45 is a functional block diagram of a mode of completion without limitation of a detection device architecture for commissioning the procedure of FIGS. 31 to 34.

DETAILED DESCRIPTION OF THE PREFERRED EMBODIMENTS

In all the figures, the common elements bear the same reference numbers.

Figure 1:
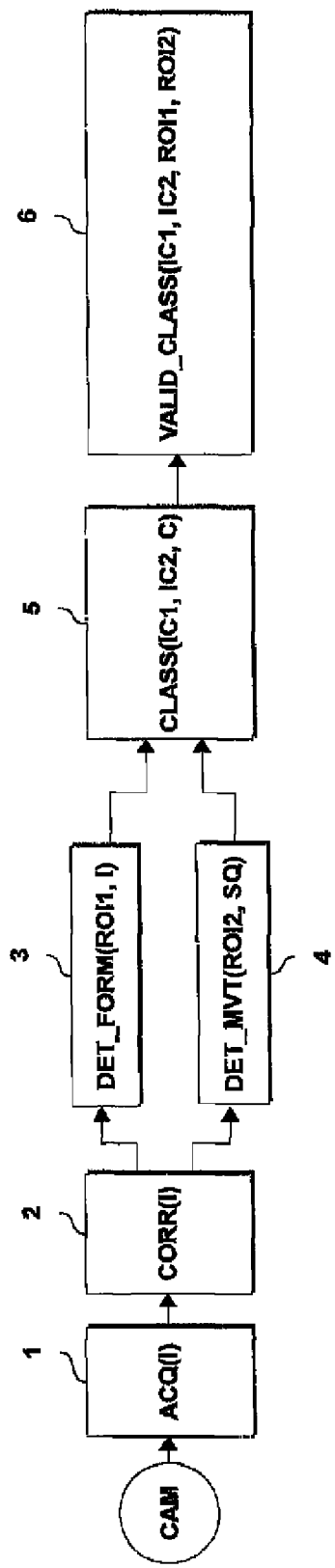
FIG. 1 is an organization chart of a first mode of completion without limitation of the detection procedure according to the invention.

The obstacle detection procedure within the area surrounding a motor vehicle according to the invention is described in a first mode of completion without limitation in FIG. 1.

One will note that the term motor vehicle means any type of motorized vehicle.

First Mode of Completion

According to this first mode of completion, the detection procedure involves the following stages as illustrated in FIG. 1:

to define at least one first region of interest ROI1 by carrying out a first detection of an obstacle O by shape recognition in an acquired image I of this environment E (stage DET_FORM(ROI1, I));

to define at least one second region of interest ROI2 by carrying out a second detection of an obstacle O by movement detection in relation to vehicle V on a sequence of acquired images SQ I of this environment E (stage DET_MVT(ROI2, SQ));

to classify the obstacle O detected with, respectively, a first IC1 and second IC2 index of confidence applied to the first ROI1 and the second ROI2 regions of interest in relation to given characteristics C (stage CLASS(IC1, IC2, C)); and to validate the classification of the detected object O in relation to these indices of confidence IC1, IC2 and in relation to these regions of interest ROI1, ROI2 (stage VALID_CLASS(IC1, IC2, ROI1, ROI2)).

In one mode of completion without limitation, the detection procedure also involves a further stage of applying a change of perspective to an acquired image (stage CORR(I)).

In one mode of completion without limitation, the detection procedure also involves a stage of acquisition of a sequence SQ of images I. One will note that this stage may be carried out upstream by another procedure.

For the rest of the description, in the mode of completion without limitation of the procedure described, the procedure includes these further stages of image acquisition and change of perspective.

The stages of the procedure are described in detail hereafter.

In a first stage 1), one acquires a sequence SQ of images I of the environment E of a vehicle V.

The acquisition takes place by means of a CAM camera.

As the image acquisition methods are known by the professional, they are not described here.

Figure 8:
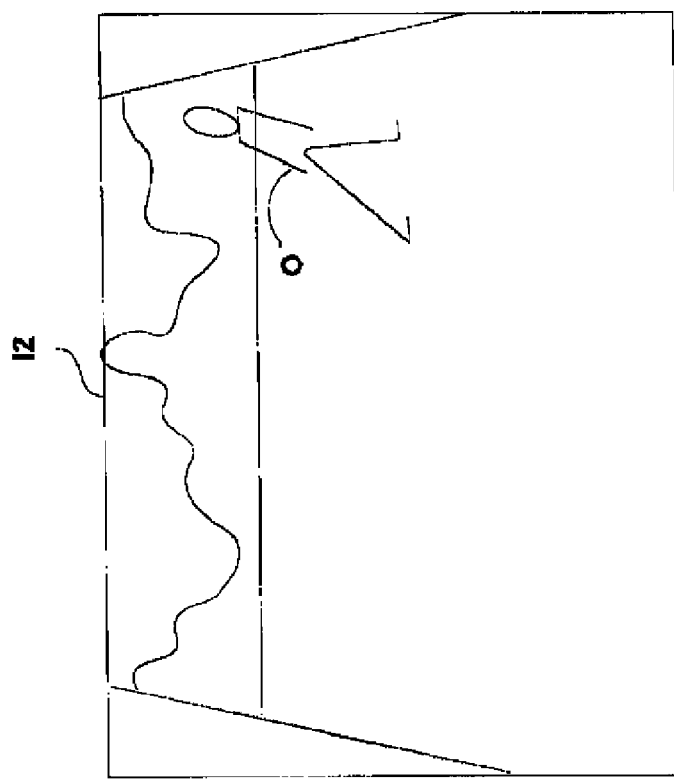
FIGS. 7 and 8 illustrate in diagram form an image used by a stage of change of perspective from the detection procedure of FIGS. 1 to 4 and a resulting image.
Figure 7:
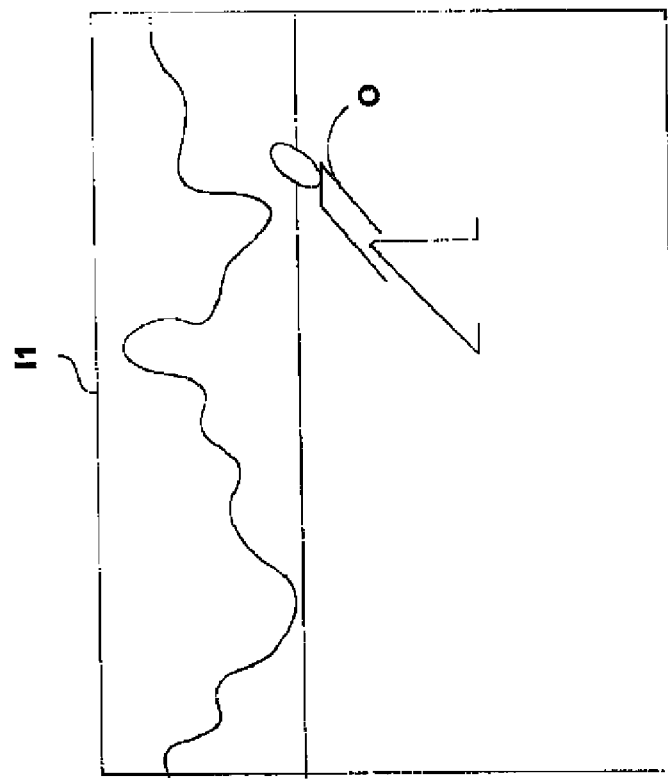

In a second stage 2), one applies a change of perspective to an acquired image I. This makes it possible to counterbalance the distortions due to the CAM camera. One thus restores the obstacles O which are situated at the edge of image I. As illustrated in a diagrammatic example in FIG. 7 and FIG. 8, from an acquired image I1, one obtains an image correction resulting in an acquired image I2.

In a third stage 3), one defines at least one first region of interest ROI1 by carrying out a first detection of an obstacle O by shape recognition in an acquired image I of this environment E.

In one mode of completion, the first detection by shape recognition uses a method well known by the professional called "AdaBoost", described in the document entitled 'An Introduction to Boosting and Leveraging by Ron Meir and Gunnar Rätsch—Department of Electrical Engineering, Technion, Haifa 32000 Israel/Research School of Information Science & Engineering—the Australian National University, Canberra, ACT 0200, Australia'.

This method is based on:

1) an initial apprenticeship stage which uses:

shape recognition by means of a VIGN label series of reference of a certain size Sz. The present example is based on a VIGN label representing an obstacle O which is a pedestrian. Thus, in one example without limitation, the VIGN label involves a size Sz of 48*24 Px pixels. The series of labels includes a set of so-called positive labels in which a pedestrian is present, and a set of so-called negative labels in which no pedestrian is present and a genetic algorithm which makes it possible to obtain a set of strong classifiers CLs, a strong classifier CLs including a sum of several weak classifiers CLw. The obtainment of weak Classifiers CLw and strong Classifiers CLs is based on a comparison pixel to pixel in the VIGN label series of reference.

A weight is associated with each strong Classifier CLs which represents a rate of good detections of an obstacle in relation to the given VIGN label series for several weak classifiers.

A weak Classifier CLw consists of a unitary test related to a comparison of a pixel in relation to another pixel in the same label. A weight is likewise associated with it.

The genetic algorithm makes it possible to calculate combinations of weak Classifiers CLw applied to the VIGN label series of reference which make it possible to achieve the rate of good detections associated with the strong Classifiers CLs.

One will note that this apprenticeship stage may be carried out upstream of the described detection procedure.

2) A use of the "Adaboost" method including the following stages, as illustrated in FIGS. 9 to 16.

a) Constructing a pyramid of images Isr by recursive sub-sampling of an acquired image I.

In practice, one applies a scale of reduction SR resulting in a sub-sampled image Isr, as illustrated in FIG. 9, and on this image one again applies a scale of reduction SR and so on.

In one mode of completion without limitation, at each iteration, a different scale of reduction SR is used, as illustrated in FIGS. 9 to 14. This makes it possible to adapt the detection distances of an obstacle O that one wishes to achieve, and thus achieve the obstacles which are situated at different distances in image I.

Thus, in examples without limitations, in FIGS. 9 to 14:
for the acquired image I, the applied scale of reduction SR1 is 1.2, resulting in the first sub-sampled image Isr1;
for the sub-sampled image Isr1, the applied scale of reduction SR2 is 2, resulting in a second sub-sampled image Isr2;
for the sub-sampled image Isr2, the applied scale of reduction SR3 is 2.3 resulting in a third sub-sampled image Isr3;
for the sub-sampled image Isr3, the applied scale of reduction SR4 is 3, resulting in a second sub-sampled image Isr4;
for the sub-sampled image Isr4, the applied scale of reduction SR5 is 4, resulting in a fifth sub-sampled image Isr5;
for the sub-sampled image Isr5, the applied scale of reduction SR6 is 5, resulting in a sixth sub-sampled image Isr6.

One will note that a scale of reduction SR is taken in accordance with the distance at which one wishes to detect an obstacle O in an acquired image I or reduced image Isr.

The examples without limitations given above make it possible to carry out a detection of an obstacle O between 0 and 9 meters from the vehicle V considered.

b) For each sub-sampled image Isr:
One scans this image Isr with a VIGN label representing a certain obstacle O, in this case a pedestrian. The VIGN label has a certain size Sz representing the pedestrian. In one example without limitation, the scanning is carried out from left to right and from top to bottom.

At each successive position of a VIGN label in this image Isr, one analyses its content by means of a set of classifiers Cls, Clw, these classifiers being determined during a phase of prior apprenticeship, as described previously.

Figure 16:
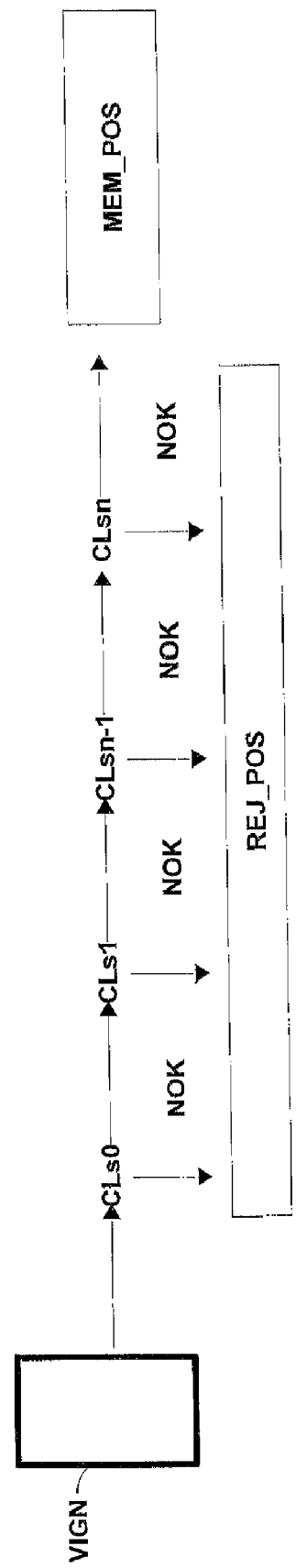

Thus, during the scanning, for each POS position of the label in an image Isr, one carries out the following sub-stages illustrated in FIG. 16 (representative of the use of the "Adaboost" method).

i) One applies the combination of weak Classifiers CLw of a first strong CLs0 classifier on this VIGN label at the current POS position;
One accumulates the weight of the weak Classifiers CLw of which the associated unitary tests are validated, i.e., positive;
One compares the accumulation with the weight of the strong CLs0 classifier.

ii) If the result is negative (that is, the accumulation is below the weight of the strong CLs0 classifier), one rejects the POS position of the VIGN label (stage REJ_POS). This means that the VIGN label at the current position involves no obstacle O which in this case is a pedestrian. One goes on to the next POS position of the label.

iii) If the result is positive (that is, the accumulation is above the weight of the strong CLs0 classifier), one applies the next strong Classifier CLs1 and one repeats stage i). In so far as the result is positive, one goes on to the next strong Classifier CLsn.

Once all the strong Classifiers CLs have given a positive result, this means that the VIGN label at the current position involves an obstacle O which in this case is a pedestrian. In this case, one memorizes the POS position of the VIGN label (stage MEM_POS illustrated) and one proceeds to the next position of the VIGN label.

One repeats stages i) to iii) for each POS position of a VIGN label in the image Isr.

One thus obtains, if applicable, a set of memorized POS positions for the sub-sampled image Isr.

Thus, one obtains a set of memorized POS positions of a VIGN label in each acquired or sub-sampled image. Each memorized POS position of a VIGN label thus represents a first region of interest ROI1.

On FIGS. 9 to 14, the label is marked out by a rectangle. Of course, it is possible to give it different shapes.

One will note that the more one increases the value of a scale of reduction SR, the more one detects obstacles, in this case pedestrians, who are close to vehicle V.

Thus, for the first sub-sampled image Isr1, it is the distant obstacles (which enter the VIGN label) that will be detected, whilst in the image Isr5 and image Isr6, it is the nearby obstacles (which enter the VIGN label) that will be detected. On the example without limitation of FIGS. 9 to 14, one can see that represented pedestrian O will be detected only in image Isr5 and image Isr6, because in these two images, it will be included in the VIGN label.

Figure 15:
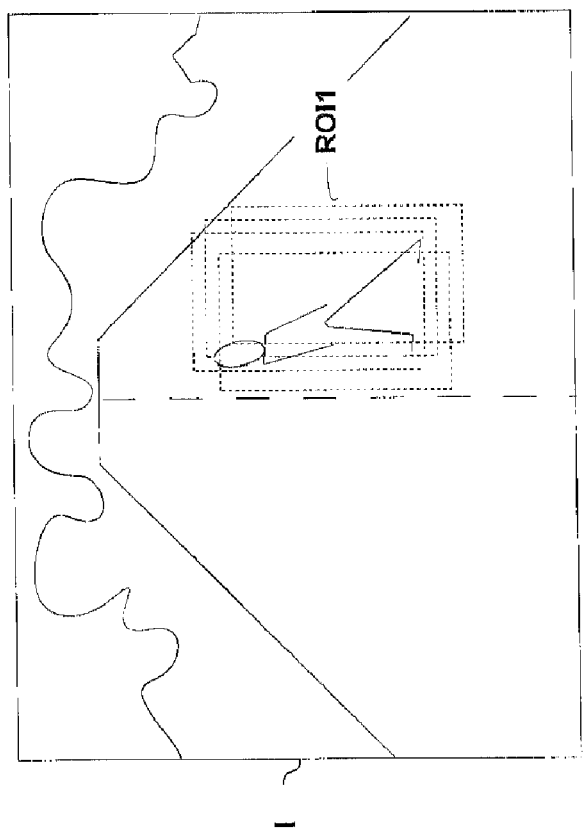

One will note that in another mode of completion, one can alternate the sub-stage of sub-sampling with the sub-stage of scanning and analysis.

c) This set of first regions of interest ROI1 is repositioned in the initial acquired image I, as illustrated in FIG. 15 by multiplying these first regions of interest ROI1 by the scale of reduction SR associated with the image from which they were calculated.

In one mode of completion without limitation, the first detection by shape recognition involves a sub-stage to determine a scanning zone Zb in a sub-sampled image Isr. This sub-stage is also applied for each sub-sampled image Isr2 to Isr6. This makes it possible to reduce the processing time. In fact, one thus avoids scanning places in an image I where one knows that one cannot detect an obstacle O in a VIGN label because:
obstacle O is bigger than this VIGN label;
obstacle O may not be situated in a part of the image outside the zone, as this part represents the sky.

Thus, in one mode of completion without limitation, the scanning zone Zb involves:

a top line H marking out a border beyond which no obstacle O may be detected in the image by means of the VIGN label; and a bottom line L marking out a border beyond which no obstacle O may be detected in the image by means of the VIGN label.

As one can see in FIGS. 9 to 14, scanning zones Zb1, Zb2, Zb3, Zb4, Zb5 and Z6 (represented by two horizontal dotted lines) were determined for the sub-sampled images Isr1, Isr2, Isr3, Isr4, Isr5 and Isr6 respectively.

In examples without limitations:

in the sub-sampled image Isr1, the bottom line of scanning zone Zb1 was placed at a distance D of 10 meters;

in the sub-sampled image Isr2, the bottom line of scanning zone Zb2 was placed at a distance D of 6 meters;

in the sub-sampled image Isr3, the bottom line of scanning zone Zb3 was placed at a distance D of 3.5 meters;

in the sub-sampled image Isr4, the bottom line of scanning zone Zb4 was placed at a distance D of 2 meters;

in the sub-sampled image Isr5, the bottom line of scanning zone Zb5 was placed at a distance D of 1 meter; and in the sub-sampled image Isr6, the bottom line of scanning zone Z6 was placed at the bottom edge of the image Isr6.

In a fourth stage 4), one defines at least one second region of interest ROI2 by carrying out a second detection of an obstacle O by movement detection in relation to vehicle V on a sequence of acquired images I of this environment E.

First Mode of Completion

Figure 2:
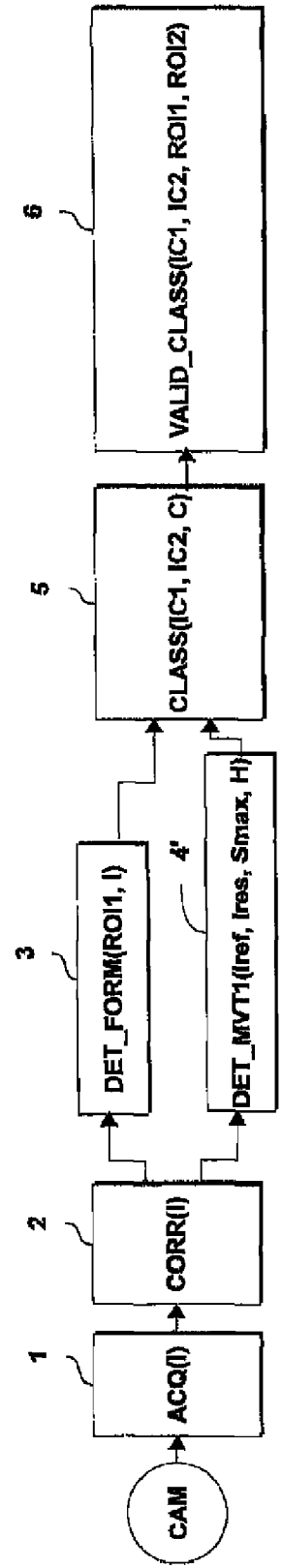
FIG. 2 is an organization chart of the first mode of completion without limitation of the detection procedure of FIG. 1, in which is illustrated a movement detection stage according to a first mode of completion without limitation.

In a first mode of completion without limitation, the second detection (stage DET_MVT1 (Iref, Ires, Smax, H) illustrated in FIG. 2) involves the following sub-stages.

a) Constructing a background Image Iref recalculated for each image I of an image sequence SQ.

In one mode of completion without limitation, this stage uses a method well known by the professional called the "Running Average Method" and described in the document G. Christogiannopoulos, P. B. Birch, R. C. D. Young, C. R. Young, "Segmentation of moving objects from cluttered background scenes using a running average model". SPIE Journal, vol 5822, pp. 13-20. 2005.

Figure 17:
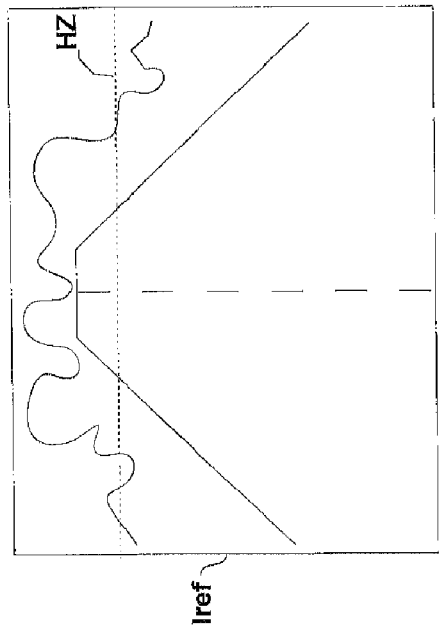
FIGS. 17 to 19 illustrate in diagram form certain images used by a first mode of completion without limitation of a movement detection stage of the detection procedure of FIGS. 1, 2 and 4.
Figure 18:
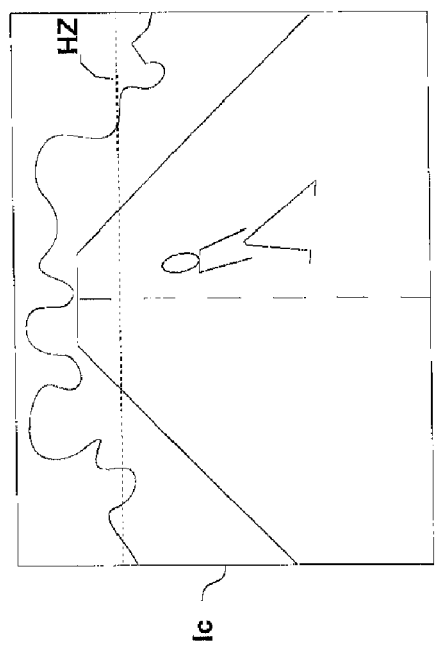
Figure 19:
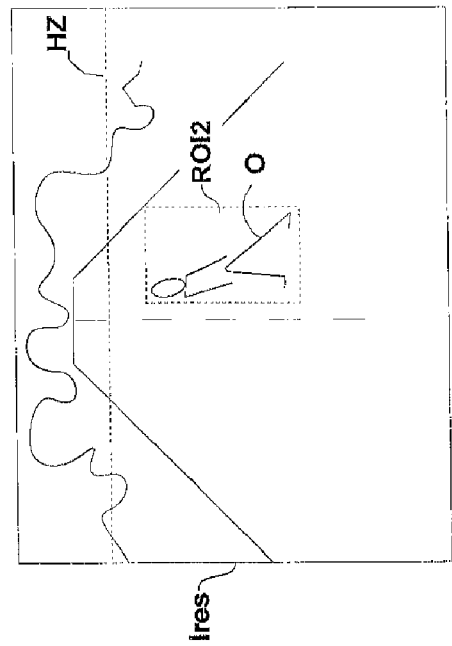

Thus, as illustrated on the example without limitation of FIGS. 17 to 19, in one mode of completion without limitation, for each acquired current Image Ic (of a sequence of images SQ) in which is situated at least one obstacle O, in this case a pedestrian, one calculates a background Image Iref such that:

$$Iref = \alpha * Ic + (1-\alpha) * Iref.$$

With α a percentage of apprenticeship.

In one example without limitation, α=0.05

This percentage of apprenticeship means that one retains 5% of the new Image Ic and 95% of the previous Image Iref.

In other words, the background evolves according to the movement of the objects (including obstacles) in the image.

One will note that the first background Image Iref is the first acquired image I in the acquired sequence SQ.

b) Taking out the background image Iref to the current Image Ic in the sequence of Image SQ, resulting in a resulting Image Ires.

After obtaining background Image Iref, one thus takes out the first current Image Ic to this background Image Iref and one obtains a resulting Image Ires.

One thus has Ires=Absolute value (Ic−Iref).

One carries out this stage on the set of acquired images I of the sequence of images SQ.

c) Discriminating certain movements in the resulting Image Ires according to an Smax threshold.

In one variant of completion without limitation, one compares the intensity of each pixel of the resulting Image Ires with this Smax threshold. If the intensity is above the Smax threshold, this means that there is movement in the resulting Image Ires.

d) Extracting second regions of interest ROI2 from the discrimination.

To this effect, in one variant of completion without limitation, one binarizes the resulting image as follows:

One compares all the Px pixels of a resulting Image Ires to a threshold of maximum intensity Sbr representing noise BR.

If the value of a Px pixel is below this intensity threshold Sbr, one positions its value at zero (black) in one example without limitation, Otherwise one positions its value at 255 (white) in an example without limitation.

In one example without limitation, in order to define the intensity threshold Sbr:

one extracts from each resulting Image Ires the maximum intensity value of levels of grey.

one establishes the intensity value threshold Sbr equal to a percentage of this maximum value, the percentage being representative of the noise BR.

In one example without limitation, the percentage is 20%.

Thus, by carrying out a binarization of the resulting Image Ires, one removes noise BR and one shows second regions of interest ROI2 representative of a moving obstacle O.

One thus distinguishes a moving obstacle O from noise.

One will note that noise BR may be for example the shadow on the ground of a tree which moves due to the wind, or even a change of light intensity on the image due to moving clouds, for example.

In one mode of completion without limitation, the second detection DET_MVT1 also involves the following stages.

a) Regrouping the regions of interest ROI2 of each resulting Image Ires which tally between them. The regions of interest ROI2 which tally between them actually represent the same obstacle O.

b) To define rectangles around these second regions of interest ROI2 obtained, as these rectangles now define these second regions of interest ROI2.

In one mode of completion without limitation, to determine the rectangle, one takes the minimum and maximum extremities of a region of interest ROI2.

In one mode of completion without limitation, the regions of interest ROI2 which are situated above a line characteristic of the horizon HZ (illustrated in FIGS. 17 to 19) in an acquired image I are not taken in account. In fact, one knows that no obstacle such as a pedestrian may be situated above the horizon line HZ.

Second Mode of Completion

In a second mode of completion without limitation as illustrated in FIG. 3 (stage DET_MVT2(Vmi, Vmv), the second movement detection involves the following sub-stages.

A) Determining points of interest PtI on an acquired image I;

B) Following these points of interest PtI on the next image I+1 and determining their displacement;

C) Regrouping into second regions of interest ROI2 these points of interest PtI having a similar displacement Vmi;

D) Determining the displacement Vmv of vehicle V; and

E) Discriminating second regions of interest ROI2 having a movement Vmi in image I not resulting from the displacement of vehicle Vmv.

These sub-stages are described hereafter.

A) To determine points of interest PtI.

To this effect, in one mode of completion without limitation, one uses a method well known by the professional called "Harris Corner". One obtains the position in x,y of a point of interest PtI.

As one can see on the diagrammatic example without limitation of FIG. 21, on an acquired image I1, one has determined of the points of interest PtI (black dots).

B) Follow-up of the points of interest PtI.

From the follow-up of the points of interest PtI of an image I in a next image I+1, one deduces from this the vectors of displacement Vmi of these points of interest PtI on an image I and on the next image I+1.

In one mode of completion without limitation, one uses a method well known by the professional called the "Lucas Kanade method" described in the document B. D. Lucas and T. Kanade "An Iterative Image Registration Technique with an Application to Stereo Vision" IJCAI '81 pp. 674-679".

As one can see on the diagrammatic example without limitation of FIG. 22, on an acquired next image I1+1, one has likewise determined the new position of the points of interest PtI (white dots) and one has determined the vectors of displacement Vmi of the points of interest PtI. For example on image I1, on a first obstacle O1, one has the point of interest PtI1 which is displaced on the next image I1+1 and gave the point of interest PtI1+1. These two points of interest corresponding to the same element of the environment acquired at a different moment give the vector of displacement Vmi1.

One will note that sub-stages A) and B) are described in greater detail in the document "The Computation of Optical flow—S. S Beauchemin and J. L Barron, University of Western Ontario—ACM Computing Surveys, Vol 27, N°3, September 1995. Since this "optical flow" method is well known by the professional, it is not described in greater detail here.

C) To regroup into second regions of interest ROI2.

One thus regroups the points of interest PtI which have identical vectors of displacement Vmi, that is:

which move in the same direction;

which have an equivalent standard (similar displacement in the number of Px pixels).

To this effect, in one mode of completion without limitation, one uses a method well known by the professional called "labelization".

From these regroupings, one determines second regions of interest ROI2. To this effect, one takes the points of extremity of the regrouped vectors of displacement.

In the diagrammatic example of FIG. 22, one thus has two regions of interest ROI21, ROI22 corresponding respectively to:

an obstacle O1 which is a pedestrian of whom one has observed a displacement;

an obstacle O2 which is a pedestrian of whom one has observed a displacement.

D) To determine the displacement Vmv of vehicle V.

To determine the displacement of vehicle V, one uses odometric values (wheel speed, rotation speed around the vertical axis) supplied by this vehicle V.

The displacement of vehicle V is represented by the displacement of the CAM camera fixed to vehicle V according to FIG. 20. FIG. 20 represents, in the image marker, the displacement of a point p towards p' due to the displacement of the CAM camera. Point p is the projection in the image marker of point P and point p' is the projection in the image marker of point P' and corresponds to the position of P after displacement of the CAM camera.

In one mode of completion without limitation, one uses the following equation which represents the displacement of the CAM camera fixed to vehicle V:

$$\begin{cases} x_{n+1} - x_n = -\frac{x_n y_n}{f}\Omega_X + \frac{f^2 + x_n^2}{f}\Omega_Y - y_n\Omega_Z + \frac{T_Z}{Z_n}\left(x_n - f\frac{T_X}{T_Z}\right) \\ y_{n+1} - y_n = -\frac{f^2 + y_n^2}{f}\Omega_X + \frac{x_n y_n}{f}\Omega_Y + x_n\Omega_Z + \frac{T_Z}{Z_n}\left(y_n - f\frac{T_Y}{T_Z}\right) \end{cases}$$

with $\Omega x$: angle of pitching of the vehicle;

$\Omega y$: angle of sway of the vehicle;

$\Omega z$: angle of rotation around the vertical axis of the vehicle;

F: Focus of the CAM camera;

Ty: Vertical transfer of vehicle V between an image I and a next image I+1;

Tz: Longitudinal transfer of vehicle V between an image I and a next image I+1;

Tx: Lateral transfer of vehicle V between an image I and a next image I+1;

Xn, Yn: the CAM camera marker;

Zn: the distance of an obstacle O in relation to the camera;

xn+1−xn: the difference of position in abscissa on the image of an obstacle O between an image I and a next image I+1; and yn+1−yn: the difference of position in ordinates on the image of an obstacle O between an image I and a next image I+1.

In one mode of completion without limitation, this is a situation where the speed of the vehicle is below or equal to a threshold representing a situation of current parking of the vehicle. In one example without limitation, the threshold is 20 km/hr.

This then gives: $\Omega x=0$ and $\Omega y=0$

Furthermore, in one mode of completion without limitation, one only considers the displacement of the vehicle in relation to the angle to the steering wheel.

Thus, Ty=0

In one mode of completion without limitation, the distance Zn is calculated from the width of a second region of interest ROI2 calculated previously in stage C) by making a hypothesis on the width a priori of obstacle O.

One can thus predict the new position of an obstacle in image I at instant T+1 ($x_{n+1}$, $y_{n+1}$) from the displacement of the vehicle and its position at instant T ($x_n$, $y_n$) and thus determine the predicted displacement Vmp of obstacle O induced by the displacement of vehicle Vmv. One supposes here that the obstacle is immobile in image I.

E) To discriminate from the second regions of interest ROI2.

To this effect, one then compares the two calculated displacements Vmi and Vmp.

If Vmi=Vmp, then one concludes that the second region of interest ROI2 to which is associated the vector of displacement Vmi is immobile, i.e., it does not move in relation to vehicle V. In this case, no account is taken of the second region of interest ROI2 representing an obstacle O.

If Vmi≠Vmp, one then concludes that the second region of interest ROI2 is mobile, i.e., it moves in relation to vehicle V. In this case, one takes account of this second region of interest ROI2 representing an obstacle OO.

In the diagrammatic example of FIG. 23, one has therefore only retained a single region of interest ROI21 corresponding to an obstacle O1 which is a pedestrian in displacement in relation to the vehicle.

The region of interest ROI22 corresponding to the obstacle O2 was not retained. In fact, obstacle O2 is a pedestrian who is immobile in relation to the vehicle. His observed displacement was only due to the displacement of the vehicle.

In one mode of completion without limitation, one associates with the second regions of interest ROI2 (which one takes into account) an index of confidence IC2.

In one variant of completion without limitation, IC2=Absolute value((Vmi−Vmp)/Vmp).

Thus, the higher the ratio, the more chance there is that obstacle O may be a mobile obstacle.

Third Mode of Completion

The second regions of interest ROI2 are defined by carrying out a second detection of an obstacle by movement detection according to the first mode of completion and the second mode of completion described above, as illustrated in FIG. 4.

In a fifth stage 5), one classifies the detected obstacle O with a first IC1 and second IC2 index of confidence respectively, applied to the first ROI1 and the second ROI2 regions of interest in relation to given characteristics C.

One recalls that the regions of interest ROI1, ROI2 are the regions determined during stages 3 and 4.

One will note however that in the mode of completion illustrated in FIGS. 3 and 4, the second regions of interest ROI2 which were determined by movement detection according to the second mode of completion (DET_MVT2(Vmi, Vmv) are not used in this stage. In fact, as one will see hereafter, this classification stage makes it possible to classify an obstacle O from regions of interest ROI1, ROI2 which represent a pedestrian as a whole, while the regions of interest ROI2 determined during the movement detection DET_MVT2 according to the second mode do not necessarily include a pedestrian as a whole.

One will remark that prior to this classification stage, one determines two types of populations one of which represents a pedestrian as follows. One will note that this determination is in general carried out upstream of the described detection procedure.

From several M labels of reference VIGNref some of which include an obstacle such as a pedestrian and some of which do not include any obstacle, one constructs histograms of reference HISTREF from the orientation contours detected in these labels (sub-stage CONST_HISTREF(VIGNref)).

Thus, in one mode of completion without limitation, the given characteristics are of histograms of orientated gradients. In one example without limitation, nine orientations are used (corresponding to nine directions over 360°). This makes it possible to obtain a good compromise between the calculation time and the quality of the classification.

At each pixel of a contour of a VIGN labelref, one calculates an orientation and one sees to which of the nine orientations OR it belongs.

One accumulates the NORM standards of the orientations on the set of the pixels of the contours of a VIGN labelref. One thus obtains a histogram of reference as illustrated in FIG. 25.

One thus obtains Histograms M of reference which may be divided into two types of populations (a population with a pedestrian or a population without) as illustrated as a diagram in 2D (DI1, DI2) in FIG. 26. One will note that a "histogram" vector having here 9 dimensions, a more adequate representation would be with 9 dimensions. For the sake of simplicity, only 2 dimensions were represented.

In order to dissociate these 2 populations, an algorithm of apprenticeship determines a border of decision.

In one mode of completion without limitation one constructs this border by a separator with a vast margin, a method known by the professional as the SVM method ("Support-Vector Machine")—published by Kluwer Academic Publishers, Boston and written by Corinna Cortes and Vladimir Vapnik. The border may, without limitation, be a polynomial function (for example FIG. 26) or a Gauss function (for example FIG. 27).

Figure 5:
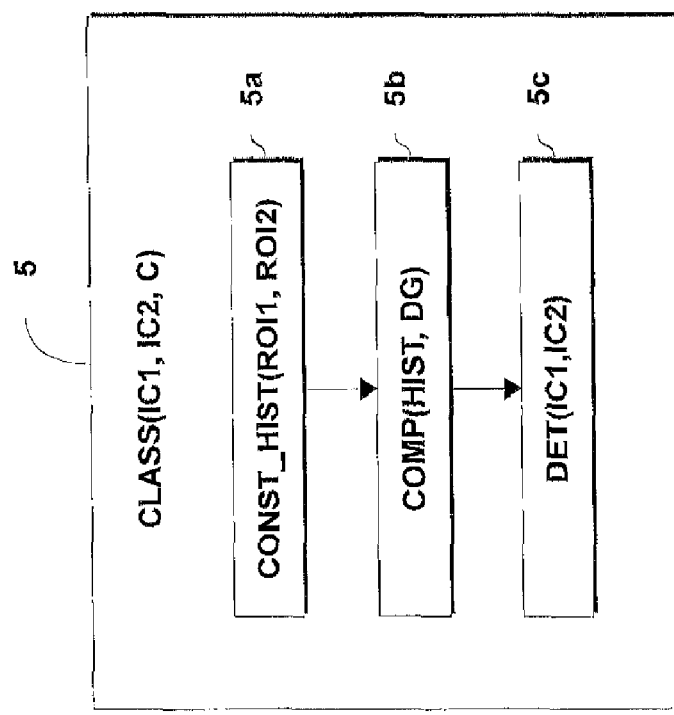
FIG. 5 is an organization chart of a mode of completion without limitation of a classification stage of the detection procedure of FIGS. 1 to 4.

The classification stage involves the following sub-stages.

a) Creating a vector of characteristics (C) from the regions of interest ROI1 and ROI2 determined during previous stages (by shape recognition and movement detection respectively according to the first mode of completion DET_MVT1) (sub-stage CONST_HIST(ROI1, ROI2) illustrated in FIG. 5).

In one mode of completion without limitation, a vector of characteristics C is a histogram of the orientated gradients GD of a region of interest ROI1, ROI2. In one example without limitation, nine orientations are used. One thus obtains "histograms", vectors including 9 values.

b) One classifies this vector of characteristics C by comparison with a border of decision DG determined previously during an apprenticeship stage (as described above) (sub-stage COMP(HIST, DG) illustrated in FIG. 5).

To this effect, one then compares the "histogram" vectors obtained with the border of decision DG. The more one retreats from the border, the higher the likelihood of belonging to a population. Furthermore, the more one approaches the border, the more ambiguous it is to belong to a population.

One determines an associated index of confidence IC according to the distance of the vector of characteristics in relation to this border of decision DG (sub-stage DET(IC1, IC2) illustrated in FIG. 5).

One thus defines the first and second indices of confidence IC1, IC2 applied to the first regions of interest ROI1 and the second regions of interest ROI2 respectively, and thus to the constructed HIST "histogram" Vectors respectively.

Thus, the closer a "histogram" vector HIST is to the border DG, the closer the associated index of confidence IC at 0.5 for example (in the case where the value of an index of confidence is situated between 0 and 1).

On the contrary, the further a "histogram" vector HIST is from border DG in the region POP1, the higher the index of confidence IC1 of belonging to the population POP1, and the weaker the index of confidence IC2 of belonging to the population POP2.

In the example without limitation taken in FIGS. 26 and 27, the first POP1 represents the first population representing a pedestrian. In this case, the index of confidence IC1 is close to 1 when it is far from border DG and in this region POP1.

One thus classifies an obstacle O with the indices of confidence IC1, IC2 applied respectively to the first and second regions of interest ROI1, ROI2 in relation to the vectors histograms HIST, the classification making it possible to determine the category of the obstacle to which it belongs, in this case a pedestrian or otherwise.

In a sixth stage 6), one validates the classification of the detected object O in relation to these indices of confidence IC1, IC2 and in relation to these regions of interest ROI1, ROI2, as illustrated in FIG. 28.

One recalls that the regions of interest ROI1, ROI2 are the regions determined during stages 3 and 4, and the indices of confidence IC1, IC2 are the indices of confidence determined during stages 4 (arising directly from movement detection according to the second mode of completion DET_MVT2 (Vmi, Vmv) and 5 (arising from the classification).

Figure 6:
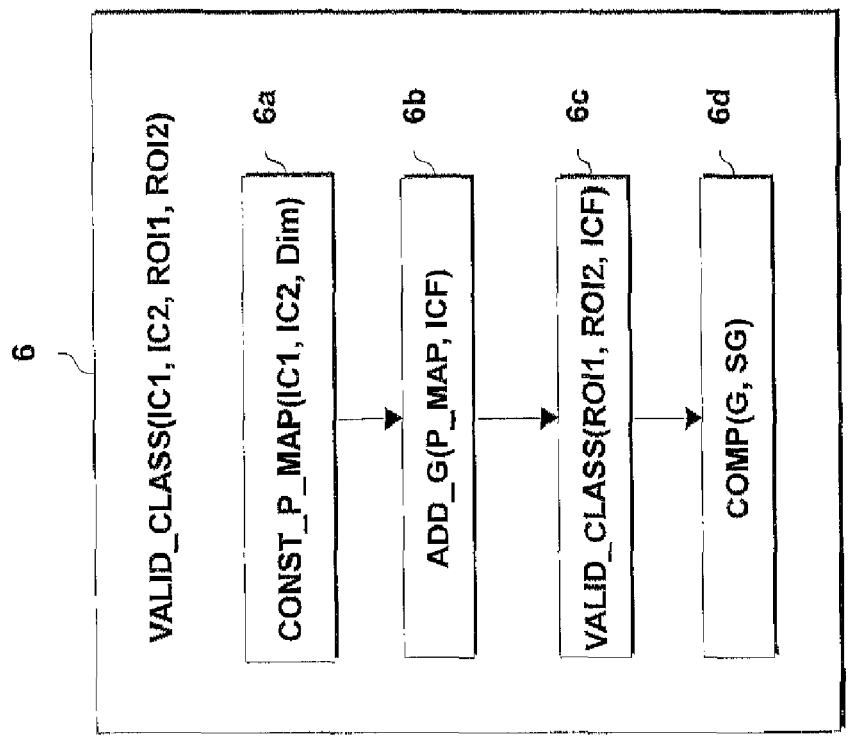
FIG. 6 is an organization chart of a mode of completion without limitation of a validation stage of the detection procedure of FIGS. 1 to 4.

In one mode of completion without limitation, the validation involves the following sub-stages as illustrated in FIG. 6.

a) Constructing a probability card P_MAP corresponding to an image I in which each classified region of interest ROI1, ROI2 is represented by a distribution of probability (sub-stage CONST_P_MAP(IC1, IC2, Dim) illustrated in FIG. 6).

To this effect, one thus establishes a probability card P_MAP based on a set of accumulated Gauss functions G, in which the Gauss functions G are constructed from:

The indices of confidence IC1 and IC2, an index representing the maximum value of a Gauss function G;

The dimensions of the first and second regions of interest ROI1 and ROI2, the dimensions representing the staggering of a Gauss function G. The dimensions taken are the height and the width.

Thus, if one represents a Gauss function G in mathematical terms, this gives:

$$f(x) = ae^{-\frac{(x-b)^2}{2c^2}}$$

With e the Euler number.

The Gauss function G is represented graphically in the form of a symmetrical curve in the shape of a bell.

One thus has:
a=the height of the bell, represented by an index of confidence IC1, IC2; and
c=the width of the bell, represented by the size (in width) of a region of interest ROI1, ROI2
b=the position of the summit of the curve.

The probability card P_MAP thus involves several Gauss functions G, some of which may or may not tally, as illustrated in one example without limitation in FIG. 29.

b) Accumulating these distributions of probability which tally in the probability card (P_MAP) in order to obtain at least one local maximum (sub-stage ADD_G(P_MAP, ICF) illustrated in FIG. 6).

To this effect, one accumulates the Gauss functions G of the probability card P_MAP which tally.

One thus obtains several local maximums resulting in several resulting indices of confidence ICF. The local maximum makes it possible to obtain the most likely localization of having an obstacle O which is a pedestrian.

As illustrated on the diagrammatic example without limitation of FIG. 29, one will obtain three local maximums of Gauss functions G.

One will note that in one mode of completion without limitation, a resulting index of confidence ICF has a ceiling of 1.

c) Validating the region of interest ROI1, ROI2 which is closer to each local maximum of the probability card P_MAP (sub-stage VALID_CLASS(ROI1, ROI2, ICF) illustrated in FIG. 6).

In one variant of completion without limitation, for each local maximum, one chooses the region of interest ROI1, ROI2 (of which the index of confidence was used for the local maximum) the summit of which is situated closer to this local maximum, and one attributes to its associated index of confidence IC1, IC2 the resulting index of confidence ICF. This variant makes it possible to refer to a region of interest ROI1, ROI2 already existing as determined beforehand in the previous stages, and makes it possible to remain accurate at the level of the localization of an obstacle O (an already existing region of interest being centered on an obstacle O).

Thus, in the example which explains the diagram of FIG. 30 (in 2D for the sake of simplicity), there are two Gauss functions g1, g2 and their local maximum gc. The Gauss function g2 is the one, the summit of which is closer to the local maximum. The associated region of interest ROI is thus validated.

In another variant of completion without limitation, one could uphold the index of confidence. ICF resulting from the accumulation of the Gauss functions. At this moment, the choice of the region of interest ROI would be a region of interest ROI centered on this index of confidence.

In one mode of completion without limitation, the validation stage also involves a further sub-stage of:

d) comparing the local maximums of the Gauss functions which tally in relation to a threshold of detection SG (sub-stage COMP (G, SG) illustrated in FIG. 6.

If each local maximum is below this threshold, one estimates that the index of confidence resulting ICF is nil. One thus estimates that no pedestrian is detected, but that the Gauss functions correspond to noise or a false detection. In this case, one retains no region of interest ROI which served the purposes of accumulation.

Thus, the validation of the classification makes it possible to select validated regions of interest taken among the first and second regions of interest ROI1, ROI2 arising from the classification stage and which each represents a pedestrian.

Second Mode of Completion

According to this second mode of completion, in addition to the stages described in the first mode, the detection procedure also involves the further stages as illustrated in FIG. 31:

7) Carry out a third obstacle detection O by sensor/s with detection range below a first threshold S1 resulting in a determined POS position (stage DET_CAPT(POS, S1));

8) Project the POS position defined in a reference marker COORef (stage PROJ_P1 (POS, COORef));

9) Project the regions of interest ROI validated in this reference marker COORef (stage PROJ_P2(ROI1, ROI2)); and 10) Align the two projections obtained PJ1, PJ2 and attribute the determined POS position to the classified obstacle O in accordance with the alignment and the validation (stage CORREL(PJ1, PJ2)).

In one mode of completion without limitation, the detection procedure also involves a further stage of confirming the detection of an obstacle on a sequence of acquired images (stage TRACK(POS)). This makes it possible to confirm the presence of a so-called validated region of interest and smooth its position over a whole sequence SQ of images I.

For the rest of the description, according to this second mode of completion without limitation, the procedure includes this further stage.

The stages are described in detail hereafter.

In a seventh stage 7), one carries out a third obstacle detection O by sensor/s with detection range below a first threshold S1 resulting in a determined POS position.

First Mode of Completion

In a first mode of completion without limitation illustrated in FIG. 32, the third detection is carried out by means of ultrasound sensors ULS (stage DET_CAPT1 (POS, S1)). The first threshold S1 is representative of the maximum detection range of an ultrasound sensor ULS. In one example without limitation, the first threshold S1 is then equal to 4 meters. As detection by ultrasound sensors is known by the professional, it is not described here. One will note only that the resulting determined POS position involves a distance Duls between the obstacle O and the ultrasound sensor of vehicle V and a detection zone Zd (which is of rectangular shape) as illustrated in the diagrammatic example without limitation of FIG. 42.

Second Mode of Completion

In a second mode of completion without limitation illustrated in FIG. 33, the third detection is carried out by means of radar sensors RAD (stage DET_CAPT2(POS, S1)). The first threshold S1 is representative of the maximum detection range of a radar sensor RAD. In one example without limitation, the first threshold S1 is then equal to 60 meters. As detection by radar sensors is known by the professional, it is not described here. One will note only that the resulting determined POS position involves a distance Drad between the obstacle O and the radar sensor of vehicle V and an angle β between the obstacle and the axis AXrad of the radar sensor as illustrated in the diagrammatic example without limitation of FIG. 42.

Third Mode of Completion

In a third mode of completion without limitation illustrated in FIG. 34, the third detection is carried out by means of ultrasound sensors and radar sensors RAD. In this case, the third detection involves a stage of regrouping the detections carried out on the same obstacle O by the ultrasound sensors ULS and radar sensors RAD (sub-stage GROUP illustrated in FIG. 34).

In one mode of completion without limitation, the regrouping is carried out by means of a comparison between the sensor distances Duls and Drad obtained. One compares each distance Duls with each distance Drad. If the difference of distances Diff1 obtained from the comparison is below a determined threshold S4, then one considers that it is the same obstacle O which was detected by both types of sensors ULS and RAD. In one example without limitation, the threshold S4 is 50 cm.

In this case (Diff1<=S4), in one mode of completion without limitation, one only retains the POS position detected by the radar sensor RAD (the detection by the latter being more accurate in general than detection by an ultrasound sensor ULS).

Otherwise (Diff1>S4), one estimates that the detections do not correspond to the same obstacle O and they are retained in so far as one was not able to regroup them with other detections.

One thus obtains a list of detected obstacles O in which one has deleted the double detections.

One will note that the fact of detecting obstacles by sensors by using both ultrasound sensors ULS and radar sensors RAD gives a very wide cover of detection. In fact, as one can see in FIG. 35, the cover of detection Zuls by ultrasound makes it possible to cover a zone close to the vehicle and in front of the vehicle, whilst the cover of detection Zrad makes it possible to cover a zone further from the vehicle and on the sides of the vehicle, as illustrated in FIG. 36. One will remark that in the latter detection by radar, there is an undetected zone Zm which is also called a dead zone.

The fact of carrying out the detections by means of both types of sensors ULS and RAD makes it possible to cover the dead zone Zm as illustrated in FIG. 37.

Furthermore, one will note that the fact of carrying out detection by means of a camera (whether by shape recognition or movement detection) combined with detection by sensors makes it possible to locate more precisely the detected obstacles in the vehicle marker, whether a combination with detection by ultrasound sensors ULS alone (as illustrated in FIG. 39) or by radar sensor RADs alone (as illustrated in FIG. 40) or by ultrasound and radar sensors (as illustrated in FIG. 41).

In an eighth stage 8), one projects the POS position defined in a reference marker COORef.

In one mode of completion without limitation, the reference marker COORef is the image marker XI; YI. This makes it possible to minimize the impact of detection errors when calculating the distance in the image of an obstacle O, as opposed to a solution in which a vehicle marker would be taken in account.

In one example without limitation, one will note that in order to carry out the projection of the POS position in the image marker XI; YI, it is sufficient to know the correspondence between the position in the image marker and the position in the vehicle marker Xv, Yv.

In one example without limitation, the projection is carried out according to a matrix of projection MP as follows.

Matrix of Passage MP:

$$\begin{matrix} -3.353858 & 3.332719 & 1029.732666 \\ -0.077005 & 1.159693 & 467.425964 \\ -0.000233 & 0.009181 & 1.000000 \end{matrix}$$

Equation $[XI, YI] = f(Xv, Yv)$ $xi' = Xv * 50$ $yi' = Yv * 50 - 200$ $w = 1/(xi' * MP(3.1) + yi' * MP(3.2) + MP(3.3))$ $xi = (xi' * MP(1.1) + yi' * MP(1.2) + MP(1.3)) * w$ $yi = (xi' * MP(2.1) + yi' * MP(2.2) + MP(2.3)) * w$ One obtains certain first projections PJ1, as illustrated in diagram form in FIG. 43 and FIG. 44, corresponding to obstacles O. the POS position of which was detected by the sensors, whether ultrasound ULS and/or radar RAD.

One will note that the projection PJ1 of a POS position of an obstacle O determined by an ultrasound sensor ULS gives a rectangle. In the example illustrated in FIG. 43, there are four rectangles PJ11, PJ13, PJ15, PJ17 (in dotted lines).

Furthermore, the projection PJ1 of a POS position of an obstacle O determined by a radar sensor RAD gives a point. In the example illustrated in FIG. 44, there are four points PJ12, PJ14, PJ16, PJ18.

The same applies in the case where both types of sensors (radar and ultrasound) were used.

In both cases (ultrasound sensors or radar sensors), this projection stage of the POS position also involves a sub-stage of defining, from a projection PJ1, an associated projection zone PJ1p.

In one mode of completion without limitation, the width of the projection zone PJ1p is centered on the projection PJ1 and the base of the projection zone is at a tangent to the projection point PJ1 (in the case of a point), as illustrated in FIG. 44, or at the base of the projection rectangle PJ1 (in the case of a rectangle) as illustrated in FIG. 43.

In one example without limitation, one takes the dimensions of a projection zone equal to 1.7 m in height by 0.7 m of width. The dimensions of this projection zone PJ1p are thus determined so that they correspond to those of a pedestrian.

Thus, in the example illustrated in FIG. 43, there are four projection zones PJ11p, PJ13p, PJ15p, PJ17p associated with the four rectangles PJ11, PJ13, PJ15, PJ17 respectively.

Thus, in the example illustrated in FIG. 44, there are four projection zones PJ12p, PJ14p, PJ16p, PJ18p associated with the four projection points PJ12, PJ14, PJ16, PJ18 respectively.

In a ninth stage 9), one projects the regions of interest ROI validated in this reference marker COORef.

One obtains certain second projections PJ2, as illustrated in diagram form in FIG. 43 and FIG. 44, corresponding to the validated regions of interest ROI1, ROI2. One will note that the projections PJ2 are in the shape of rectangles. In the example illustrated, there are three corresponding rectangles PJ21, PJ22, PJ23 (in uninterrupted strokes).

In a tenth stage 10), one aligns the two projections obtained PJ1, PJ2 and one attributes the determined POS position to the classified obstacle O in accordance with the alignment.

In one mode of completion without limitation, the alignment is a comparison between two projections PJ1, PJ2 which is carried out according to the following criteria:
a surface of covering Sr between two projections PJ1, PJ2;
a ratio Rt in height between the size of the two projections PJ1, PJ2; and
a difference Diff2 of distances between two projections PJ1, PJ2.

One will note that the distance of a projection PJ1 is the distance Duls or Drad given by the CAPT sensor.

Furthermore, the distance of a projection PJ2 is the distance detected in an image I of a region of interest ROI and recalculated in the vehicle marker V by the matrix of projection MP.

In examples without limitations:
the surface of covering Sr is 70%;
the ratio Rt is situated between 0.5 and 1.5; and
the difference Diff2 is 1 meter.

One recalls that the projection PJ1 of detection by sensors is represented by the projection zone PJ1$p$ described previously. Thus, in practice, the comparison is carried out between a projection zone PJ1$p$ and a projection PJ2.

Thus, in the case where all these criteria are fulfilled, one estimates that the alignment between two projections PJ1, PJ2 is positive. Otherwise, one retains the projection PJ1, PJ2 until an alignment is found with another projection PJ2, PJ1 respectively.

If no alignment is found, then it is considered negative.
In the diagrammatic example of FIG. 43:
the projections PJ21, PJ11$p$
tally;
Sr>70%;
Rt is situated between 0.5 and 1.5;
Diff2<1 m.
the projections PJ22, and PJ13$p$
tally;
Sr<70%;
Rt is situated between 0.5 and 1.5;
Diff2>1 m.
the projections PJ23, and PJ15$p$
tally;
Sr<70%;
Rt is situated between 0.5 and 1.5;
Diff2<1 m.
In the diagrammatic example of FIG. 44:
the projections PJ21, PJ12$p$
tally;
Sr>70%;
Rt is situated between 0.5 and 1.5;
Diff2<1 m.
the projections PJ23, and PJ16$p$
tally;
Sr<70%;
Rt is situated between 0.5 and 1.5;
Diff2>1 m.

Thus, once the alignment is positive, one deduces from this that the corresponding obstacle O is a pedestrian and in one mode of completion without limitation, one attributes to it:
the associated POS position detected by the sensors; and
the associated region of interest ROI validated during stage 6).

Furthermore, in one mode of completion without limitation, one increases its associated index of confidence IC. In one example without limitation, the new index of confidence IC=IC+(1−IC)/2.

In another mode of completion, one can associate with it:
the estimated position in the vehicle marker (of the associated region of interest); and
the associated projection zone defined PJ1$p$.

One will note however that the POS position detected by the sensors is more accurate than the estimated position, and that the region of interest ROI is likewise more accurate than the defined projection zone.

If no alignment is found for a projection PJ1 or PJ2 then:
in one mode of completion without limitation, one carries out the following tests.
If the projection is a sensor projection PJ1, one then deduces that the detected obstacle O is not a pedestrian;
If the projection is a projection PJ2 of a region of interest ROI, then
If the Index of confidence IC associated with it is above a threshold of confidence Sc,
One then deduces that the detected obstacle O is a pedestrian,
Otherwise, one deduces from this that the detected obstacle is not a pedestrian and one positions its index of confidence IC at 0.

In one example without limitation, the threshold of confidence Sc=0.7.

In a eleventh stage 11), one carries out a follow-up of validated regions of interest on a sequence SQ of acquired images.

In one mode of completion without limitation, this stage uses a method well known by the professional called ESM ("Efficient Second Order Method") developed by the INRIA and described in the document "Benhimane, E. Malis, Real-time image-based tracking of planes using efficient second-order minimisation IEEE/RSJ International Conference on Intelligent Robots Systems, Sendai, Japan, 2004".

This method is based on a research of the same pattern in a sequence SQ of acquired images I, more particularly between a current image and an image of reference, and on the repetition of this Pattern in a certain number of images I of the sequence SQ. This avoids losing a detection of obstacle O in the case where an obstacle O would not be detected on an image I of a sequence SQ, while it was detected on the other images I.

Thus, the procedure of the invention described makes it possible to reliably detect obstacles O, whether or not they are pedestrians, based not only on detection by shape recognition, but also movement detection recognition, and if applicable detection by sensors.

The procedure of the invention is commissioned by a DISP device of detection of an obstacle O within an environment E of a motor vehicle, this device being represented in diagram form in FIG. 45.

This DISP device is integrated in the motor vehicle V.
This DISP device is fit to:
define at least one first region of interest ROI1 by carrying out a first detection FCT1 of an obstacle O by shape recognition in an acquired image I of this environment E;
define at least one second region of interest ROI2 by carrying out a second detection of an obstacle by movement detection in relation to vehicle V on a sequence of acquired images I of this environment E;

classify the obstacle O detected with, respectively, a first IC1 and second IC2 index of confidence applied to the first ROI1 and the second ROI2 regions of interest in relation to given characteristics C; and validate the classification of the detected object O in relation to these indices of confidence IC1, IC2 and in relation to these regions of interest ROI1, ROI2.

It involves a control unit UC fit to carry out the stages above.

In one mode of completion without limitation, the DISP device of detection is also fit to:

carry out a third obstacle detection O by sensor/s with detection range below a first threshold S1 resulting in a determined POS position;

project the POS position defined in a reference marker COORef;

project the validated regions of interest ROI1, ROI2 in this reference marker COORef; and align the two projections obtained PJ1, PJ2 and attribute the determined POS position to the classified obstacle O in accordance with the alignment.

In modes of completion without limitations, the detection DISP device is, moreover, fit to:

at the time of the first detection by shape recognition:
construct a pyramid of images Isr by recursive sub-sampling of an acquired image I;
for each sub-sampled image Isr:
  determine a region of interest ROI;
  scan this image Isr with the region of interest ROI;
at each successive position of a region of interest ROI in this image Isr, analyze the content of the region of interest ROI by a set of classifiers Cls, Clw, these classifiers being determined during a phase of prior apprenticeship.
at the time of a second movement detection:
construct a background Image Iref recalculated for each image I of an image sequence SQ;
take out the background Image Iref to the current Image Ic in the sequence of image SQ, resulting in a resulting Image Ires;
discriminate certain movements in the resulting Image Ires according to an Smax threshold; and
extract second regions of interest ROI2 from the discrimination.
at the time of a second movement detection:
determine points of interest PtI on an acquired image I;
follow these points of interest PtI on the next image I+1 and determine their displacement;
regroup into second regions of interest ROI2 these points of interest PtI having a similar displacement Vmi;
determine the displacement Vmv of vehicle V; and
discriminate second regions of interest ROI2 having a movement Vmi in the image which does not result from the displacement of vehicle Vmv.
at the time of the classification stage:
create a vector of characteristics C from the regions of interest ROI;
classify this vector of characteristics C by comparison with a border of decision DG determined previously during an apprenticeship stage; and
determine an associated index of confidence IC according to the distance of the vector of characteristics in relation to this border of decision.
at the time of the validation stage:
construct a probability card P_MAP corresponding to an image I in which each classified region of interest ROI1, ROI2 is represented by a distribution of probability;
accumulate these distributions of probability which tally in the probability card P_MAP in order to obtain a local maximum; and
validate the region of interest ROI1, ROI2 which is closer to each local maximum of the probability card P_MAP.
apply a change of perspective to an acquired image I.
follow validated regions of interest on a sequence SQ of acquired images.

In one mode of completion without limitation, the DISP device involves a set of control units UC including at least one control unit fit to carry out the stages described above. In one variant of completion without limitation, the set involves several control units UC1, UC2, UC3. Thus, in variants of completion without limitation, the control units UC may be divided into the CAM camera, the projectors PJ, the sensors ULS, RAD, or even a calculator vehicle ECU.

In the example without limitation of FIG. 45, the functions of first and second detections are divided into the CAM camera and the sensor detection functions in the CAPT sensors, the others being divided into the ECU calculator.

In one mode of completion without limitation, the CAM camera is of type VGA or WGA and makes it possible to acquire images of respective size of 640/480 pixels or 752*480 pixels. In one example without limitation, the angle of opening $\phi$ is 130°. Of course, other types of cameras with other characteristics may be used.

One will note that the above-mentioned detection procedure may be commissioned by means of a micro-programmed "software" device, a hard-wired logic and/or electronic "hardware" components.

Thus, the DISP adjustment device may involve one or more computer program products PG including one or more sequences of instructions executable from an information processing unit such as a microprocessor, or a processing unit of a microcontroller, ASIC, computer etc., the execution of these sequences of instructions allowing the described procedure to be commissioned.

Such a computer programme PG may be recorded in ROM type non-volatile recordable memory or in EPPROM or FLASH type non-volatile re-recordable memory. This computer programme PG may be recorded in memory in the factory or again loaded in memory or remotely loaded in memory. The sequences of instructions may be sequences of machine instructions, or again sequences of a command language interpreted by the processing unit at the time of their execution.

In the example without limitation of FIG. 45, there are several computer programme products PG1, PG2, PG3 which are recorded in a memory of the control unit/s UC1, UC2, UC3 of the DISP device.

Of course, the invention is not limited to the modes of completion and examples described above.

Thus, once the detection of a pedestrian has been validated, one can arrange an alert system which makes it possible to alert the driver of vehicle V that a pedestrian is situated close to the vehicle and enables him to brake, for example. One can also provide an automatic braking system following such a detection.

Thus, the detection procedure may be used for detection behind and/or in front of the motor vehicle V.

Thus, the invention particularly presents the following advantages:

it reduces the number of processing operations to be carried out thanks to:
  the determination of regions of interest in particular detection zones (below a horizon line or even in a scanning zone);

the establishment of the displacement of an obstacle in relation to the vehicle by means of specific points of interest;

the application of the classification stage (by a method of spreading by categories) only on obstacles detected by shape and movement recognition and not on a whole image;

it makes pedestrian detection more reliable thanks to the following combination:

detection by shape recognition which makes it possible to recognize a pedestrian as a whole;

movement detection which makes it possible to recognize an obstacle which is mobile, particularly pedestrians of whom one only sees one part of the moving body;

detection by sensors.

it uses components currently present on a motor vehicle, such as a camera and ultrasound or radar detectors;

it strengthens pedestrian detection by using a method of spreading obstacles by categories in order to classify all the obstacles detected by shape recognition and movement recognition;

it increases the index of confidence concerning pedestrian detection thanks to the validation stage and thus reduces the number of detections to be subsequently processed if applicable (if detection by sensors is used); and it confirms the detection of an obstacle on a sequence of images once this detection is no longer detected of one image on the other by the first and second detections.

While the procedure herein described, and the forms of apparatus for carrying this procedure into effect, constitute preferred embodiments of this invention, it is to be understood that the invention is not limited to this precise procedure and forms of apparatus, and that changes may be made in either without departing from the scope of the invention, which is defined in the appended claims.

What is claimed is:

1. An obstacle detection procedure (O) within an environment (E) of a motor vehicle, featuring the fact that it involves the following stages:

defining at least one first region of interest (ROI1) by carrying out a first detection of an obstacle (O) by shape recognition in an acquired image (1) of this environment (E);

defining at least one second region of interest (ROI2) by carrying out a second detection of an obstacle by movement detection in relation to the vehicle (V) on a sequence of acquired images (I) of this environment (E);

classifying the obstacle (O) detected with, respectively, a first (IC1) and second (IC2) index of confidence applied to the first (ROI1) and the second (ROI2) regions of interest in relation to given characteristics (C);

validating the classification of the detected object (O) in relation to these indices of confidence (IC1, IC2) and in relation to these regions of interest (ROI1, ROI2) resulting in validated regions of interest (ROI1, ROI2);

carrying out a third obstacle detection (O) by sensor/s (ULS; RAD) with detection range below a first threshold (S1) resulting in a determined position (POS);

projecting the determined position (POS) in a reference marker (COORef);

projecting the validated regions of interest (ROI1, ROI2) in this reference marker (COORef); and aligning the two projections obtained (PJ1, PJ2) and attributing a determined position (POS) to the classified obstacle (O) in accordance with the alignment.

2. The obstacle detection procedure according to claim 1, wherein the reference marker is the image marker (XI, YI).

3. The obstacle detection procedure according to claim 1, wherein the first detection by shape recognition involves the following sub-stages:

constructing a pyramid of images (Isr) by recursive sub-sampling of an acquired image (I);

for each sub-sampled image (Isr):

scanning this image (Isr) with a label (VIGN) representing a certain obstacle (O);

at each successive position of a label (VIGN) in this image (Isr), analyzing its content by means of a set of classifiers (Cls, Clw), these classifiers being determined during a phase of prior apprenticeship.

4. The obstacle detection procedure according to claim 2, wherein the first detection by shape recognition also involves a further sub-stage to determine a scanning zone (Zb) in a sub-sampled image (Isr).

5. The obstacle detection procedure according to claim 1, wherein a second movement detection involves the following sub-stages:

constructing a background image (Iref) recalculated for each image (I) of a sequence of images (SQ);

taking out the background image (Iref) to the current image (Ic) in the sequence of images (SQ) resulting in a resulting image (Ires);

discriminating certain movements in the resulting image (Ires) according to a threshold (Smax); and extracting second regions of interest (ROI2) from the discrimination.

6. The obstacle detection procedure according to claim 1, wherein a second movement detection involves the following sub-stages:

determining points of interest (PtI) on an acquired image (I);

following these points of interest (PtI) on the next image (I+1) and determining their displacement (Vmi);

regrouping into second regions of interest (ROI2) these points of interest (PtI) having a similar displacement (Vmi);

determining the displacement (Vmv) of the vehicle (V); and discriminating second regions of interest (ROI2) having a movement (Vmi) in the image which does not result from the displacement of the vehicle (Vmv).

7. The obstacle detection procedure according to claim 1, wherein the classification stage involves the following sub-stages:

creating a vector of characteristics (C) from the regions of interest (ROI);

classifying this vector of characteristics (C) by comparison with a border of decision (DG) determined previously during an apprenticeship stage; and determining an associated index of confidence (IC) according to the distance of the vector of characteristics in relation to this border of decision (DG).

8. The obstacle detection procedure according to claim 1, wherein the vector of characteristics (C) is a histogram of the orientated gradients of a region of interest (ROI1, ROI2).

9. The obstacle detection procedure according to claim 1, wherein the validation stage involves the following sub-stages:

constructing a probability card (P_MAP) corresponding to an image (I) in which each classified region of interest (ROI1, ROI2) is represented by a distribution of probability;

accumulating these distributions of probability which tally in the probability card (P_MAP) in order to obtain at least one local maximum; and validating the region of interest (ROI1, ROI2) which is closer to each local maximum of the probability card (P_MAP).

10. The obstacle detection procedure according to claim 1, wherein detection by sensor/s is carried out by means of ultrasound sensors (ULS).

11. The obstacle detection procedure according to claim 1, wherein detection by sensor/s is carried out by means of radar sensors (RAD).

12. The obstacle detection procedure according to claim 1, wherein it also involves a further stage of applying a change of perspective to an acquired image (I).

13. The obstacle detection procedure according to claim 1, wherein it also involves a further stage of follow-up of validated regions of interest on a sequence (SQ) of acquired images.

14. The obstacle detection device of an obstacle (O) within an environment (E) of a motor vehicle, arranged to commission a procedure according claim 1.

15. A non-transitory computer-readable medium storing a computer program product (PG) including one or more sequences of instructions that, when executed by an information processing unit, causes the processing unit to perform the method according to claim 1.

* * * * *